(12) United States Patent
Rao et al.

(10) Patent No.: US 8,417,758 B1
(45) Date of Patent: Apr. 9, 2013

(54) LEFT AND RIGHT MATRIX MULTIPLICATION USING A SYSTOLIC ARRAY

(75) Inventors: Raghavendar M. Rao, Austin, TX (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 880 days.

(21) Appl. No.: 12/552,180

(22) Filed: Sep. 1, 2009

(51) Int. Cl.
  *G06F 7/32* (2006.01)
  *G06F 7/00* (2006.01)

(52) U.S. Cl.
  USPC ........... 708/522; 708/201; 708/205; 708/209; 708/607

(58) Field of Classification Search .................. None
  See application file for complete search history.

(56) References Cited

U.S. PATENT DOCUMENTS

| | | | |
|---|---|---|---|
| 4,727,503 A | 2/1988 | McWhirter | |
| 4,777,614 A | 10/1988 | Ward | |
| 4,823,299 A | 4/1989 | Chang et al. | |
| 5,018,065 A | 5/1991 | McWhirter et al. | |
| 5,323,335 A | 6/1994 | Mitchell | |
| 5,475,793 A | 12/1995 | Broomhead et al. | |
| 6,675,187 B1 | 1/2004 | Greenberger | |
| 7,069,372 B1 | 6/2006 | Leung et al. | |
| 7,120,658 B2 | 10/2006 | Nash | |
| 7,489,746 B1 | 2/2009 | Awater et al. | |
| 7,606,207 B2 | 10/2009 | Becker et al. | |
| 7,685,219 B2 | 3/2010 | Li | |
| 7,933,353 B2 | 4/2011 | Maltsev et al. | |
| 8,190,549 B2 | 5/2012 | Yang et al. | |
| 2003/0018675 A1 | 1/2003 | Asai et al. | |
| 2004/0071207 A1* | 4/2004 | Skidmore et al. | 375/233 |
| 2008/0028015 A1 | 1/2008 | Seki | |
| 2009/0110120 A1 | 4/2009 | McNamara et al. | |
| 2009/0116588 A1 | 5/2009 | McNamara et al. | |
| 2009/0310656 A1* | 12/2009 | Maltsev et al. | 375/340 |
| 2011/0125819 A1 | 5/2011 | Mazahreh et al. | |
| 2011/0264721 A1 | 10/2011 | Patel et al. | |

OTHER PUBLICATIONS

Omidi, Mohammmad Javad et al., "Parallel Structures for Joint Channel Estimation and Data Detection over Fading Channels," *IEEE Journal on Selected Areas in Communications*, Dec. 1998, pp. 1616-1629, vol. 16, No. 9, IEEE, Piscataway, New Jersey, USA.
U.S. Appl. No. 12/814,319, filed Jun. 11, 2010, Rao et al.
U.S. Appl. No. 12/552,171, filed Sep. 1, 2009, Raghavendar et al.
U.S. Appl. No. 12/552,174, filed Sep. 1, 2009, Raghavendar et al.
U.S. Appl. No. 12/552,178, filed Sep. 1, 2009, Raghavendar et al.

(Continued)

*Primary Examiner* — Scott Sun
(74) *Attorney, Agent, or Firm* — W. Eric Webostad; Lois D. Cartier; Gerald Chan

(57) ABSTRACT

A method, machine-readable medium, and systolic array for left matrix multiplication of a first matrix and a second matrix are described. The first matrix is a triangular matrix, and a cross-diagonal transpose of the first matrix is loaded into a triangular array of cells in an integrated circuit. A cross-diagonal transpose of the second matrix is input into the triangular array of cells for multiplication with the cross-diagonal transpose of the first matrix to produce an interim result. The interim result is cross-diagonally transposed to provide a left matrix multiplication result, which is stored or otherwise output.

20 Claims, 28 Drawing Sheets

OTHER PUBLICATIONS

Böhnke, Ronald et al., "Reduced Complexity MMSE Detection for BLAST Architectures," *Proc. of the 2003 IEEE Global Telecommunications Conference*, Dec. 1, 2003, pp. 2258-2262, vol. 4, IEEE, Piscataway, New Jersey, USA.

Edman, Fredrik, *Digital Hardware Aspects of Multiantenna Algorithms*, PhD thesis, 2006, pp. 98, Lund University, Department of Electroscience, Lund, Sweden.

Edman, Fredrik et al., "A Scalable Pipelined Complex Valued Matrix Inversion Architecture," *Proc. of the 2005 IEEE International Symposium on Circuits and Systems*, May 23, 2005, vol. 5, IEEE, Piscataway, New Jersey, USA.

El-Amawy, A. et al., "Parallel VLSI algorithm for stable inversion of dense matrices," *IEE Proceedings—E Computer and Digital Techniques*, Nov. 1989, pp. 575-580, vol. 136, Issue 6, IEEE, Piscataway, New Jersey, USA.

Gentleman, W. M. et al., "Matrix triangularization by systolic arrays," *Proc. SPIE Symposium on Real-Time Signal Processing IV*, Aug. 1981, pp. 19-26, vol. 298.

Haller, B. et al., "Efficient Implementation of Rotation Operations for High Performance QRD-RLS Filtering," *Proc. of the 1997 IEEE International Conference on Application-Specific Systems, Architectures and Processors*, Jul. 14, 1997, pp. 162-174, IEEE, Piscataway, New Jersey, USA.

Hassibi Babak, "An Efficient Square-Root Algorithm for BLAST," *Proc. of the 2000 IEEE International Conference on Acoustics, Speech and Signal Processing*, Jun. 5, 2000, pp. 737-740, vol. 2, IEEE, Piscataway, New Jersey, USA.

Haykin, Simon, *Adaptive Filter Theory*, 2002, pp. 838-841, Appendix F, Prentice Hall, Upper Saddle River, New Jersey, USA.

Hemkumar, Nariankadu, "Efficient Complex Matrix Transformations with CORDIC," *Proc. of the 1993 IEEE 11$^{th}$ Symposium on Computer Arithmetic*, Jun. 29, 1993, pp. 122-129, IEEE, Piscataway, New Jersey, USA.

Hemkumar, Nariankadu D., *A Systolic VLSI Architecture for Complex SVD*, MS Thesis, May 1991, pp. 1-122, Rice University, Department of Electrical and computer Engineering, Houston, Texas.

Karkooti, Marjan et al., "FPGA Implementation of Matrix Inversion Using QRD-RLS Algorithm," *Conference Record of the 39$^{th}$ Asilomar Conference on Signals, Systems and Computers*, Oct. 28, 2005, pp. 1625-1629, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, 2008, pp. 1-14, vol. 2008, Hindawi Publishing Corp., New York, New York, USA.

Sayed, Ali, *Fundamentals of Adaptive Filtering*, 2003, pp. 804-807, Section 12.A.1, John Wiley & Sons, Inc., Hoboken, New Jersey, USA.

U.S. Appl. No. 12/623,624, filed Nov. 23, 2009, Tarn et al.

U.S. Appl. No. 12/623,656, filed Nov. 23, 2009, Mazahreh et al.

Altera Corp., *QR Matrix Decomposition*, Application Note AN-506-2.0, Feb. 2008, pp. 1-55, Altera Corporation, San Jose, California, USA.

Boher, Laurent et al., "Analysis of CORDIC-based Triangularization for MIMO MMSE Filtering," *Proc. of the 2008 IEEE International Symposium on Circuits and Systems (ISCAS 2008)*, May 18, 2008, pp. 948-951, IEEE, Piscataway, New Jersey, USA.

Laroche, Isabelle et al., "An Efficient VLSI Architecture of a Layered Space-Time Receiver," *Proc. of the IEEE 65$^{th}$ Vehicular Technology Conference*, Apr. 1, 2007, pp. 387-391, IEEE, Piscataway, New Jersey, USA.

Ma, Lei et al., "Modified Givens Rotations and Their Application to Matrix Inversion," *Proc. of the International Conference on Acoustics, Speech and Signal Processing (ICASSP 2008)*, Mar. 31, 2008, pp. 1437-1440, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, Jan. 2008, pp. 1-14, Hindawi Publishing Corp., New York, New York, USA.

U.S. Appl. No. 12/839,198, filed Jul. 19, 2010. Rao.

Bellis, S. J. et al., "Alternative systolic array for non-square-root Cholesky decomposition," *IEEE Proc.-Comput. Digit. Tech.*, Mar. 1997, pp. 57-64, vol. 144, No. 2, IEEE, Piscataway, New Jersey, USA.

Brent, Richard P., *Computing the Cholesky Factorization Using a Systolic Architecture*, Sep. 1982, pp. 1-15, TR 82-521, Cornell University, Department of Computer Science, Ithaca, New York, USA.

Porta, Tiba, *A Programmable Systolic Array for Factorial Data Analysis Part I: Matrix Computations*, Jun. 1987, pp. 1-17, Research Report YALEU/DCS/RR-542, Yale University, Department of Computer Science, New Haven, Connecticut, USA.

Salmela, Perttu et al., "DSP Implementation of Cholesky Decomposition," *Proc. of the 2006 Joint IST Workshop and Symposium on Trends in Communications (sympoTIC '06)*, Jun. 27, 2006, pp. 6-9, IEEE, Piscataway, New Jersey, USA.

Wyrzykowski, R. et al., "One-dimensional processor arrays for linear algebraic problems," *IEEE Proc.—Comput. Digit. Tech.*, Jan. 1995, pp. 1-4, vol. 142, No. 1, IEEE, Piscataway, New Jersey, USA.

Yang, Depeng et al., "An FPGA Implementation for Solving Least Square Problem," *Proc. of the 2009 17$^{th}$ IEEE Symposium on Field Programmable Custom Computing Machines*, Apr. 5, 2009, pp. 303-306, IEEE Computer Society, Washington, DC, USA.

\* cited by examiner $$Q = \begin{bmatrix} c^* & s^* \\ -s & c \end{bmatrix} \overset{100}{\curvearrowleft}$$

FIG. 1

$$\overset{200}{\curvearrowleft} \underbrace{\begin{bmatrix} c^* & s^* \\ -s & c \end{bmatrix}}_{100} \underbrace{\begin{bmatrix} a \\ b \end{bmatrix}}_{201}$$

FIG. 2

$$\underbrace{\overbrace{c = a/\left(\sqrt{aa^* + bb^*}\right)}^{301} = \overbrace{a/\left(\sqrt{|a|^2 + |b|^2}\right)}^{304}}_{\phantom{x}}$$
$$\underbrace{s = b/\left(\sqrt{aa^* + bb^*}\right)}_{302} = \underbrace{b/\left(\sqrt{|a|^2 + |b|^2}\right)}_{305}$$

FIG. 3

$$\alpha = \sqrt{|a|^2 + |b|^2} \overset{403}{\curvearrowleft}$$

FIG. 4

$$Q^{-1} = Q^H \overset{501}{\curvearrowleft}$$
$$QQ^H = Q^H Q = I \overset{502}{\curvearrowleft}$$
$$Q = Q_1^H \cdot Q_2^H \cdot \ldots Q_m^H \overset{503}{\curvearrowleft}$$

FIG. 5

$$\underbrace{\begin{bmatrix} c^* & s^* \\ -s & c \end{bmatrix}}_{100} \underbrace{\begin{bmatrix} a \\ b \end{bmatrix}}_{201} = \underbrace{\begin{bmatrix} \sqrt{|a|^2 + |b|^2} \\ 0 \end{bmatrix}}_{601} = \underbrace{\begin{bmatrix} \alpha \\ 0 \end{bmatrix}}_{602}$$

FIG. 6

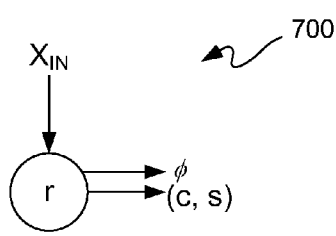
FIG. 7A
(Prior Art)
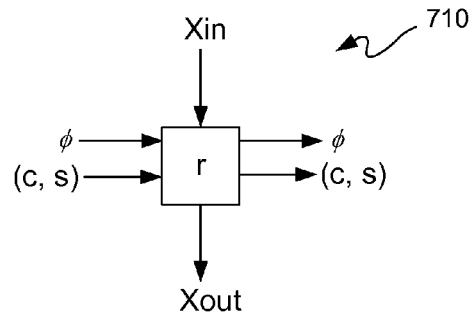
FIG. 7B
(Prior Art)
IF $(Xin = 0)$,
  $c = 1, s = 0$,
ELSE
  $|Xin|$ and $angle(Xin) = ConvertComplexToReal(Xin)$
  Propagate $\phi = angle(Xin)$ to neighbors
  $r' = \sqrt{(r^2 + |Xin|^2)}$
  $c = \dfrac{r}{r'}$
  $s = \dfrac{Xin}{r'}$
  $r(new) = r'$
⟵ 701
FIG. 7C
(Prior Art)
⟵ 711
Apply $\phi$ to $Xin$
$Xout = -s \cdot r + c \cdot Xin$
$r = c \cdot r + s \cdot Xin$
FIG. 7D
(Prior Art)

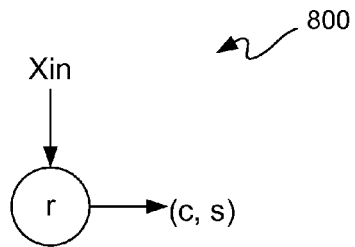
FIG. 8A
IF $(Xin = 0)$, — 802
    $c = 1, s = 0,$ — 803
ELSE
    $r' = \sqrt{(r^2 + Xin \; Xin^*)}$ — 804
    $c = \dfrac{r}{r'}$ — 805
    $s = \dfrac{Xin}{r'}$ — 806
    $r(new) = r'$ — 807
FIG. 8C
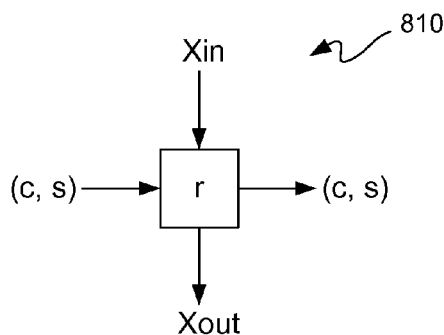
FIG. 8B
$X_{out} = -s \cdot r + c \cdot Xin$ — 808
$r(new) = c^* \cdot r + s^* \cdot Xin$ — 809
FIG. 8D

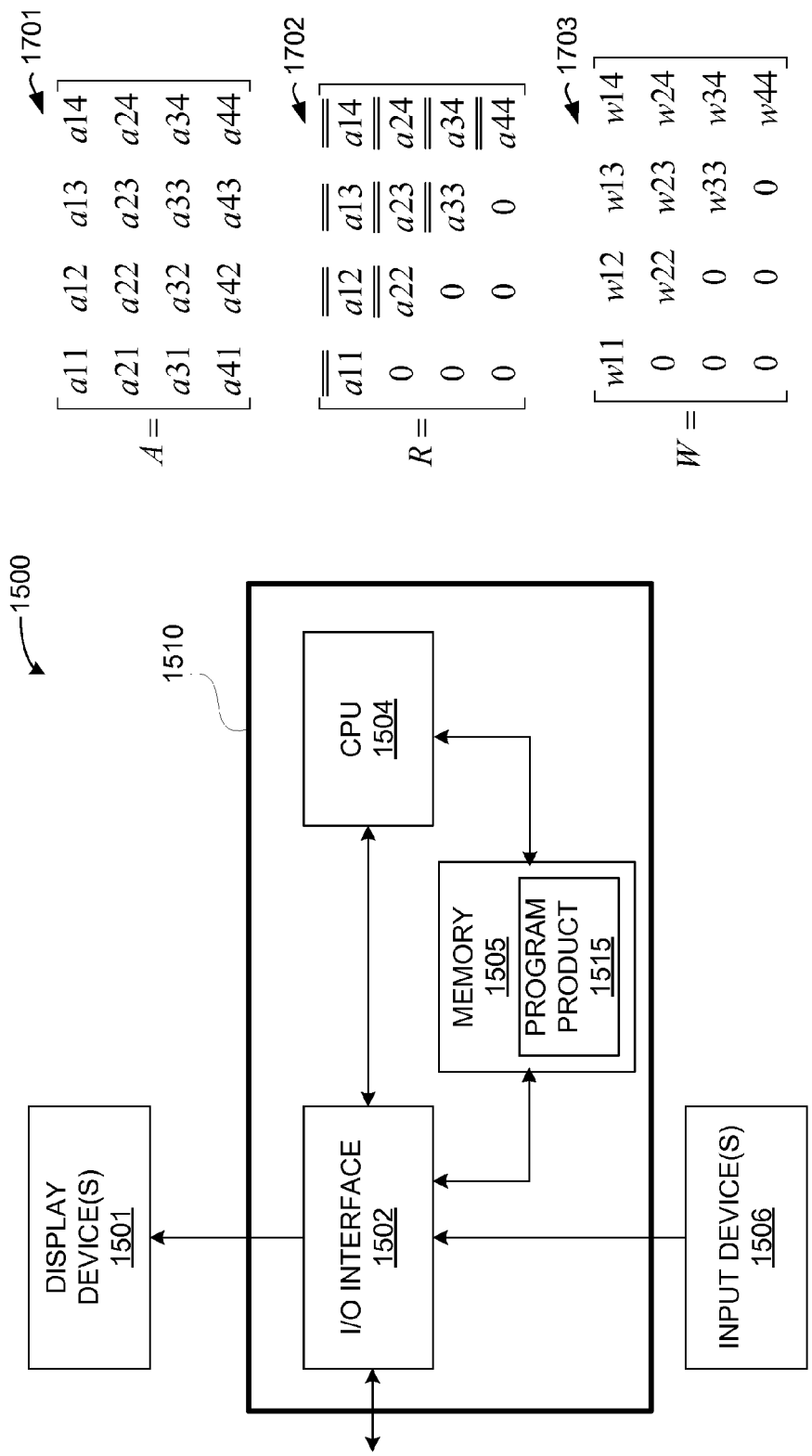

If (i>j) ← 1602
    $W_{ij} = 0;$
else if (i==j)
    $W_{ij} = (r_{ij})^{-1};$ ← 1603
else if (i<j)
    $W_{ij} = -\left(\sum_{m=1}^{j-1} W_{im} r_{mj}\right) W_{jj}$ ← 1601
end

FIG. 16

$W_{ij} = \left(\overline{\overline{a_{ij}}}\right)^{-1}$ ← 1800

FIG. 18

$r1 = \sqrt{|a21|^2 + |a11|^2}$ ← 1901

$ir1 = (r1)^{-1}$ ← 1902

$c1 = (a11)(ir1)$ ← 1903

$s1 = (a21)(ir1)$ ← 1904

$\overline{a11} = c1(a11) + s1(a21) = r1$ ← 1905

$\overline{a21} = 0$ ← 1906

FIG. 19

$W_{11} = \left(\overline{\overline{a_{11}}}\right)^{-1}$ ← 2001

$W_{22} = \left(\overline{\overline{a_{22}}}\right)^{-1}$ ← 2002

$W_{12} = -(W_{11} \overline{a_{12}}) W_{22}$ ← 2003

$z = -(W_{11}(\overline{\overline{a12}}))$ ← 2004

FIG. 20

$$2110 \begin{cases} r' = \sqrt{|r1|^2 + a \cdot a^*} \quad \leftarrow 2111 \\ ir = \dfrac{1}{r'} \quad \leftarrow 2112 \\ c = r1 \cdot ir \\ s = a \cdot ir \\ new \quad r1 = r' \end{cases}$$

$$2120 \begin{cases} ir = \dfrac{1}{r'} = \dfrac{1}{r1} \quad \leftarrow 2122 \\ w = ir \cdot x \quad \leftarrow 2121 \end{cases}$$

$$2210 \begin{cases} z = -s \cdot r1 + c \cdot x & \leftarrow 2211 \\ newr1 = c^* \cdot r1 + s^* \cdot x \\ c = c \\ s = s \end{cases}$$

$$2220 \begin{cases} z = -(wi \cdot (r1)) + x & \leftarrow 2221 \\ wo = wi & \leftarrow 2222 \\ c = 1 & \leftarrow 2223 \end{cases}$$

$$(W_{MxN}(x,y))^{Tc} \Rightarrow \overline{W}_{NxM}(x,y) = W(N-y+1, M-x+1)$$

$$AW = \left(W^{Tc} A^{Tc}\right)^{Tc}$$

$$y = Hx + n \quad \leftarrow 3201$$

$$\hat{x} = Wy \quad \leftarrow 3202$$

$$J = E\left[(x-\hat{x})(x-\hat{x})^H\right] \quad \leftarrow 3203$$

$$W = \left(H^H H + \sigma^2 I_{nT}\right)^{-1} H^H \quad \leftarrow 3204$$

$$\underline{H} = \begin{bmatrix} H_{nRxnT} \\ \sigma I_{nT} \end{bmatrix} \quad \leftarrow 3205$$

$$\underline{y} = \begin{bmatrix} y_{nRx1} \\ 0_{nT} \end{bmatrix} \quad \leftarrow 3206$$

$$\hat{x} = W\underline{y} = \underbrace{\overbrace{\left(\underline{H}^H \underline{H}\right)^{-1}}^{3209} \underline{H}^H}_{3208} \underline{y} = \underline{H}^\dagger \underline{y} \quad \leftarrow 3207$$

$$H^\dagger = (H^H H)^{-1} H^H \quad \leftarrow 3210$$

$$H = QR \quad \leftarrow 3211$$

$$H^\dagger = R^{-1} Q^H \quad \leftarrow 3212$$

FIG. 33

$$\underline{H} = \begin{bmatrix} H \\ \sigma I_{nT} \end{bmatrix} = \underbrace{\underline{Q}_{(n_T+n_R)x(n_T+n_R)} \underline{R}_{(n_T+n_R)xn_T}}_{3302} = \begin{bmatrix} Q_{1(n_R x(n_T+n_R))} \\ Q_{2(n_T x(n_T+n_R))} \end{bmatrix} \underline{R} \quad \leftarrow 3301$$

$$\sigma I_{nT} = Q_2 \underline{R} \quad \Rightarrow \quad \underline{R}^{-1} = \frac{1}{\sigma} Q_2 \quad \leftarrow 3303, 3304$$

$$\hat{x} = \underline{H}^\dagger \underline{y} = \underline{R}^{-1} \begin{bmatrix} Q_1^H & Q_2^H \end{bmatrix} \underline{y} = \frac{1}{\sigma} Q_2 Q_1^H y = \underline{R}^{-1} Q_1^H y \quad \leftarrow 3305$$

$$\underbrace{\phantom{XXXX}}_{3306} \quad \underbrace{\phantom{XXXX}}_{3307} \quad \underbrace{\phantom{XXXX}}_{3308}$$

$$H = Q_1 \underline{R} \quad \Rightarrow \quad Q_1 = H \underline{R}^{-1}$$
$$\phantom{XXXXX}_{3312} \phantom{XXXXXXX}_{3309}$$

$$(n_T + n_R) x (n_T + n_R) \quad \leftarrow 3310$$

$$W = \underline{R}^{-1} Q_1^H \quad \leftarrow 3311$$

FIG. 34

$$H = \begin{bmatrix} h_{11} & h_{12} \\ h_{21} & h_{22} \end{bmatrix}$$

$$H = \begin{bmatrix} h_{11} & h_{12} \\ h_{21} & h_{22} \\ \sigma & 0 \\ 0 & \sigma \end{bmatrix} \quad \underline{Q} = \begin{bmatrix} X & X & X & X \\ X & X & X & X \\ X & X & X & X \\ X & X & X & X \end{bmatrix} \quad \underline{R} = \begin{bmatrix} X & X \\ 0 & X \\ 0 & 0 \\ 0 & 0 \end{bmatrix}$$

FIG. 35

LEFT AND RIGHT MATRIX MULTIPLICATION USING A SYSTOLIC ARRAY

FIELD OF THE INVENTION

The invention generally relates to a matrix multiplication. More particularly, the invention relates to a systolic array for left and right matrix multiplication for an integrated circuit ("IC").

BACKGROUND

As is known, systolic arrays have been used for VLSI systems. A systolic array is a matrix of individual signal processing cells, where overall operation of the systolic array depends upon functions of the individual signal processing cells and the interconnection scheme of such signal processing cells. A clock signal is conventionally applied to a systolic array to control data flow therethrough.

While an interconnection scheme may include only interconnects between nearest neighbor signal processing cells within a systolic array, interconnection schemes are not limited to having only nearest neighbor interconnects. Moreover, a systolic array may be pipelined, namely where data stream bits are clocked into and out of signal processing cells for sequential processing. In some pipelined implementations, back-to-back data words of a data stream may be processed by a signal processing cell, where a leading word of a sequence is clocked out of such signal processing cell at generally the same time an immediately following word of the sequence is clocked into such signal processing cell.

Matrix triangularization using systolic arrays was described by Gentleman and Kung in "Matrix triangularization by systolic arrays" in SPIE, Vol. 298, Real-Time Signal Processing IV (1981) at pages 19-26 (hereinafter "Gentleman and Kung"). Gentleman and Kung proposed solving linear least squares problems using systolic arrays. As is known, least squares problems arise in both data and signal processing applications. Gentleman and Kung proposed coupling two systolic arrays, where a first of the two systolic arrays, which is triangular, is used for implementing a pipelined sequence of Givens rotations for QR decomposition ("QRD"). However, Gentleman and Kung's matrix triangularization and least squares solution is predicated on processing matrices with only real numbers.

For a matrix with one or more complex numbers, namely a "complex matrix," heretofore, a complex-to-real data reduction was performed to convert each individual cell in the complex matrix to a real number before performing a Givens rotation by factoring out the phase before Givens rotations and applying such phase at a later stage. Complex-to-real data reduction and application of a conventional complex Givens Rotations matrix is known, such as described in a book entitled "Adaptive Filter Theory, $4^{th}$ Edition" by Simon Haykin, published by Pearson Education (Asia), Indian Edition in 2002, at pages 838-841 (hereinafter "Simon Haykin"), and a book entitled "Fundamentals of Adaptive Filtering, $1^{st}$ Edition" by Ali Sayed, published by John Wiley in 2003, at pages 804-807. Additionally, others have proposed various forms of phase factoring for complex-to-real data reduction. However, complex-to-real data reduction adds additional complexity, and thus adds overhead, whether implemented in hardware or software, or a combination thereof.

A boundary cell and an internal cell of a systolic array for processing real numbers are described in detail in U.S. Pat. No. 4,727,503 ("McWhirter"). In McWhirter, a boundary cell and an internal cell for use in a systolic array configured for Givens rotation as described by Gentleman and Kung are described, which description is incorporated by reference herein in its entirety. FIG. 7A is a block diagram of a prior art boundary cell 700 of a systolic array for processing complex numbers, and FIG. 7B is a block diagram of a prior art internal cell 710 of a systolic array for processing complex numbers. Boundary cell 700, in contrast to the boundary cell described in McWhirter, has a $\phi$ output associated with the phase of a complex number. Likewise, internal cell 710, in contrast to the internal cell described in McWhirter, has a $\phi$ input and a $\phi$ output each of which is associated with the phase of a complex number. Another paper that disclosed factoring out the phase and applying it at a later stage is "Efficient Implementation of Rotation Operations for High Performance QRD-RLS Filtering", by B. Haller, J. Gotze and J. R. Cavallaro published in IEEE conference on Application-Specific Systems, Architectures and Processors, 1997, Proceedings, published on 14-16 Jul. 1997, pages 162-174.

In McWhirter, equations for implementing the boundary cell and the internal cell thereof are listed. Likewise, FIG. 7C lists equations 701 for implementing boundary cell 700, and FIG. 7D lists equations 711 for implementing internal cell 710. In contrast to such equations in McWhirter, equations 701 and 711 include having to deal with phase $\phi$. More particularly, boundary cell 700 has to convert a phase to a real number in terms of an input $X_{in}$ and output such phase $\phi$ for tracking by an internal cell 710. An internal cell 710 uses phase $\phi$, such as output from a boundary cell or output from another internal cell 710 in a systolic array, to apply rotation to an input $X_{in}$ thereto. Accordingly, it should be appreciated that performing a complex-to-real data reduction and having to account for phase $\phi$ in terms of rotation of an input adds overhead to a systolic array for processing complex numbers.

Right multiplication of an upper triangular matrix with another matrix using a triangular systolic array is known, and thus not described in unnecessary detail. However, there are instances when left matrix multiplication would be useful.

Accordingly, it would be desirable and useful to provide a systolic array capable of both right and left matrix multiplication.

SUMMARY

One or more aspects generally relate to a matrix multiplication. More particularly, one or more aspects relate to a systolic array for left and right matrix multiplication for an IC.

An embodiment relates generally to a method for left matrix multiplication of a first matrix and a second matrix, the first matrix being a triangular matrix, the method including: loading a cross-diagonal transpose of the first matrix into a triangular array of cells formed in an integrated circuit; inputting a cross-diagonal transpose of the second matrix into the triangular array of cells for multiplication with the cross-diagonal transpose of the first matrix to produce an interim result; cross-diagonally transposing the interim result to provide a left matrix multiplication result; and outputting the left matrix multiplication result from the triangular array of cells. (As used herein, "outputting" or "output" can mean, without limitation, writing to a memory or a file, passing to another cell or block, writing to a user display or other output device, playing audible notifications or providing other physical feedback to a user, sending or transmitting to another system, exporting, or the like.)

In one or more other embodiments of the method for left matrix multiplication, one or more of the following aspects may be included. The first matrix and the second matrix can be stored in a memory; and the cross-diagonal transpose of each of the first matrix and the second matrix can be obtained by respectively reading out from the memory the first matrix and the second matrix in cross-diagonal order. The cross-diagonally transposing the interim result can include writing the interim result to the memory in cross-diagonal order. The loading of the cross-diagonal transpose of the first matrix can include using a cross-diagonal of the first matrix as a reference for transposing values stored in those cells of the triangular array of cells not on the cross-diagonal. The triangular array of cells can be a systolic array. The triangular array of cells can be an upper right triangular array of cells.

Another embodiment relates generally to a systolic array in an integrated circuit. The systolic array includes: boundary cells oriented along a main diagonal of the systolic array; internal cells disposed in a corner, wherein the systolic array is a triangular matrix; the boundary cells and the internal cells configurable for any of a plurality of modes including a triangularization mode, a back-substitution mode, and a multiplication mode; the boundary cells having first multipliers; the internal cells having second multipliers; and the first multipliers and the second multipliers for multiplication of a first matrix and a second matrix responsive to the multiplication mode being invoked.

In one or more other embodiments of the systolic array, one or more of the following aspects may be included. Memory can be coupled to the systolic array for storing a first matrix and a second matrix. (In the present specification, the term "coupled" is used to represent both permanent, i.e., hard-wired, connections, and connections that may result from configuring the circuit to form a different connection, e.g., when selecting one of multiple modes of operation.) The first multipliers and the second multipliers can be used for each of the plurality of modes. The first matrix can be of the triangular matrix form for loading the boundary cells and the internal cell respectively, and the first matrix can be loaded in a first cross-diagonal transpose order. The second matrix can be input to an input row of the systolic array including a boundary cell of the boundary cells and a subset of the internal cells, and the second matrix can be input in a second cross-diagonal transpose order with zero padding for multiplication with the first matrix loaded in the cross-diagonal transpose order to provide an interim result matrix. The memory can be coupled to the systolic array for writing the interim result matrix in a third cross-diagonal transpose order to the memory as a left matrix multiplication result. The triangular matrix of the systolic array can be a right upper triangular matrix instantiated with digital signal processor blocks.

Another embodiment relates generally to a machine-readable medium having stored thereon information representing instructions that, when executed by processor means, causes the processor means to perform operations for left matrix multiplication. The operations, when executed, include: obtaining from first storage a first matrix in a first cross-diagonal transpose order; obtaining from second storage a second matrix in a second cross-diagonal transpose order; right matrix multiplying a cross-diagonal transpose of the first matrix with a cross-diagonal transpose of the second matrix with the processor means to provide an interim matrix result; and outputting the interim matrix result to third storage in a third cross-diagonal transpose order to provide a left matrix multiplication result.

In one or more other embodiments of the machine-readable medium, one or more of the following aspects may be included. The first storage, the second storage, and the third storage can be in memory. The obtaining from the first storage and the obtaining from the second storage can be reads from the memory. The outputting can be a write to the memory. The processor means can include one or more digital signal processors. The one or more digital signal processors can be all internal to a Programmable Logic Device. The processor means can include one or more General-Purpose Processors.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 1 is a matrix diagram depicting an exemplary embodiment of a modified Givens rotation matrix ("modified matrix") for use with zeroing out at least one cell of a complex matrix.

FIG. 2 is a matrix diagram depicting an exemplary embodiment of another modified matrix that may be used for matrix multiplication with an input matrix for an application of a Givens rotation.

FIG. 3 is a listing of equations depicting an exemplary embodiment of calculations for variables of the modified matrix of FIG. 1 and complex numbers of the modified matrix of FIG. 2.

FIG. 4 is an equation depicting an exemplary embodiment of calculations for expressing aspects of the equations of FIG. 3 as real values.

FIG. 5 is a listing of equations depicting an exemplary embodiment of calculations for unitary matrices and a Givens rotation matrix which is unitary.

FIG. 6 is a matrix diagram depicting an exemplary embodiment of a resultant matrix which is the product of the matrix multiplication of FIG. 2.

FIGS. 7A and 7B are block diagrams of respective exemplary embodiments of a prior art boundary cell and a prior art internal cell of a systolic array for processing complex numbers.

FIGS. 7C and 7D are listings of equations depicting respective exemplary embodiments of calculations for implementing the prior art boundary cell and the prior art internal cell of FIGS. 7A and 7B, respectively.

FIGS. 8A and 8B are block diagrams of respective exemplary embodiments of a boundary cell and an internal cell of a systolic array for processing complex numbers. The boundary cell and internal cell of FIGS. 8A and 8B, respectively, have been internally configured for processing complex numbers.

FIGS. 8C and 8D are listings of equations depicting respective exemplary embodiments of calculations for implementing the boundary cell and the internal cell of FIGS. 8A and 8B, respectively. More particularly, these listings of equations depict respective exemplary embodiments of a boundary cell flow and an internal cell flow.

FIG. 15 is a block diagram of an exemplary embodiment of a computer system.

FIG. 16 is a flow diagram depicting an exemplary embodiment of a back-substitution flow.

FIG. 17 is a matrix diagram depicting exemplary embodiments of three four-by-four matrices.

FIG. 18 is an equation depicting an exemplary embodiment of calculations for variables of the matrices of FIG. 17.

FIG. 19 is a listing of equations depicting an exemplary embodiment of computations of certain input values for the matrices of FIG. 17.

FIG. 20 is a listing of equations depicting an exemplary embodiment of calculations associated with cell outputs of the systolic array of FIG. 23.

FIGS. 33 and 34 are listings of equations depicting exemplary embodiments of computations associated with a Square Root Minimum Mean Squared Error ("Square-Root-MMSE") process for a MIMO decoder.

FIG. 35 is a block diagram depicting an exemplary embodiment of a square-root MMSE process.

DETAILED DESCRIPTION

Figure 9:
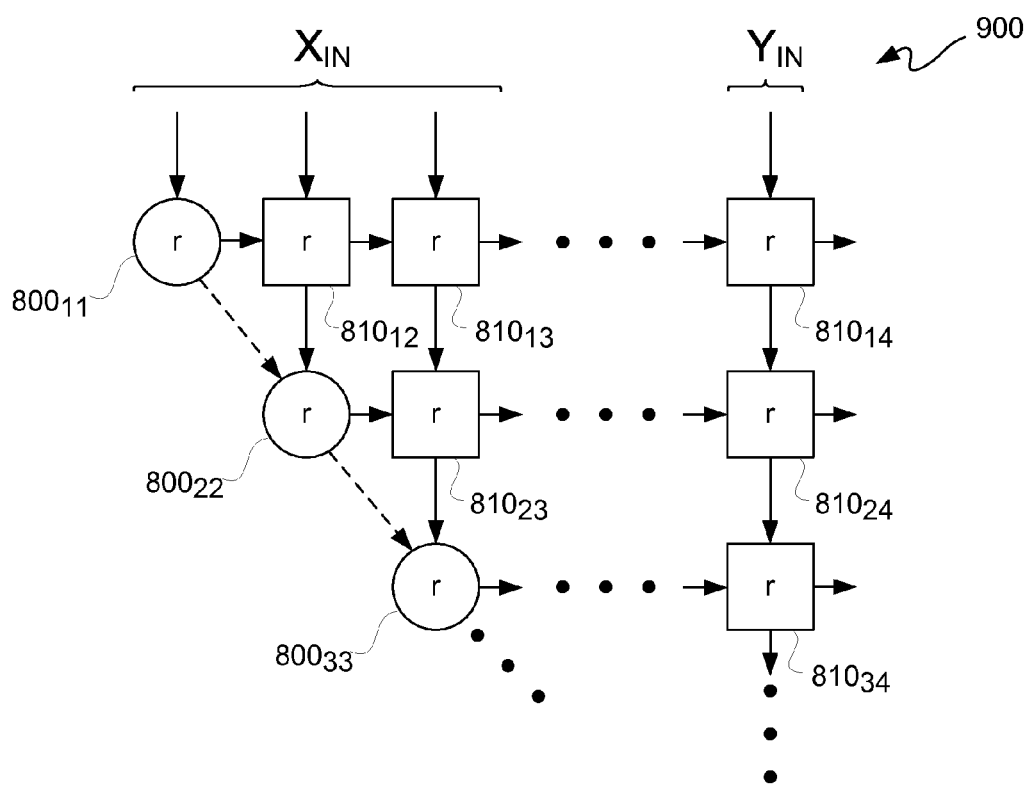
FIG. 9 is a block diagram depicting an exemplary embodiment of a systolic array capable of handling complex matrices.

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Reference will now be made in detail to embodiments, examples of which are illustrated in the accompanying drawings. In the following detailed description, numerous specific details are set forth in order to provide a thorough understanding of the invention. It should be apparent, however, to one skilled in the art, that the invention may be practiced without all the specific details given below. Moreover, the embodiments are not intended to be exhaustive or to limit the invention to the precise forms disclosed, and modifications and variations are possible in light of the following teachings or may be acquired from practice of the invention. The embodiments were chosen and described in order to best explain principles of the invention and practical applications thereof to enable others skilled in the art to utilize the invention in various embodiments and with various modifications as are suited to the particular use contemplated. In other instances, well-known methods, procedures, components, circuits, and networks have not been described in detail so as not to unnecessarily obscure the embodiments.

For purposes of explanation, specific nomenclature is set forth to provide a thorough understanding of the various inventive concepts disclosed herein. However, the terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, words, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Inventive concepts described herein may be embodied as apparatus, method, system, or computer program product. Accordingly, one or more of such embodiments may take the form of an entirely hardware embodiment, an entirely software embodiment (including firmware, resident software, and micro-code, among others) or an embodiment combining software and hardware, and for clarity any and all of these embodiments may generally be referred to herein as a "circuit," "module," "system," or other suitable terms. Furthermore, such embodiments may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency ("RF"), or other means.

Computer program code for carrying out operations in accordance with inventive concepts described herein may be written in an object oriented programming language such as Java, Smalltalk, C++, or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the required purposes, or it may comprise a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

The embodiments are described below with reference to flowchart illustrations and/or block diagrams of methods, apparatus (including systems), and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order depicted in the figures. For example, two blocks shown in succession may, in fact, be executed substantially concurrently, or the blocks may sometimes be executed in the reverse order, depending upon the functionality involved. It should also be understood that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of method steps, the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

Modified Givens Rotation

FIG. 1 is a matrix diagram depicting an exemplary embodiment of a modified Givens rotation matrix ("modified matrix") Q 100 for use with zeroing out at least one cell of a complex matrix. Modified matrix Q 100 includes complex numbers $c^*$, $c$, $-s$, and $s^*$. Number $s^*$ is the complex conjugate of number $s$, and number $c^*$ is the complex conjugate of number $c$. Numbers c and s are obtained from one or more complex numbers of an input matrix of an application.

It should be understood that matrix Q 100 is a modified form of a conventional complex Givens rotation matrix such as described in Simon Haykin, at page 839. It should be understood that in contrast to a conventional complex Givens rotation matrix, modified matrix Q 100 has a complex conjugate $c^*$ in an upper leftmost position, such as cell (1, 1) in this example, with respect to numbers of modified matrix Q 100.

FIG. 2 is a matrix diagram depicting an exemplary embodiment of a modified matrix Q 100 that may be used for matrix multiplication 200 with an input matrix P 201 for an application of a Givens rotation. Matrix P 201 includes complex numbers a and b.

For matrices larger than the example matrix P 201, modified matrix Q 100 is effectively redistributed, though the order of elements relative to one another is generally unchanged. It should be understood that a single Givens rotation or multiple Givens rotations may be used in succession for matrix inversion using modified matrix Q 100. Accordingly, Givens rotation as used herein includes either or both a single Givens rotation or multiple Givens rotations, unless otherwise indicated.

It should further be understood that modified matrix Q 100 may be used to zero out any cell of a complex matrix, and that one or more iterative applications of modified matrix Q 100 may be used to zero out any two or more cells of a complex matrix. Thus, even though an example of QRD is described herein, it should be understood that modified matrix Q 100 may be used in any application involving a complex matrix where one or more cells of such complex matrix are to be nulled or zeroed out. It should further be understood that modified matrix Q100 is directly matrix multiplied with complex matrix 201, namely without having to first perform complex-to-real data reduction prior to performing a Givens rotation with modified matrix Q 100.

FIG. 3 is a listing of equations depicting an exemplary embodiment of calculations for c and s of modified matrix Q 100 of FIG. 1 for complex numbers a and b of FIG. 2. Equation 301 is for calculation of c from a, b, $a^*$ and $b^*$, and Equation 302 is for calculation of s from a, b, $a^*$ and $b^*$, where $a^*$ and $b^*$ respectively are the complex conjugates of a and b. Obtaining a complex conjugate of a number, whether implemented in software or hardware is relatively straightforward. However, results of Equations 301 and 302 may be further reduced as respectively indicated as results 304 and 305.

Complex numbers c and s in modified matrix Q 100 may be respectively expressed as complex numbers a and b with each divided by the square root of the sum of the squares of the magnitude of complex number a and the magnitude of complex number b as indicated in results 304 and 305. The divisor in results 304 and 305 may be expressed as a real value, α, as defined in Equation 403 of FIG. 4. Additionally, α, as defined in Equation 403 of FIG. 4, forms part of each of the reductions 304 and 305 respectively of Equations 301 and 302, respectively defining c and s for the example of matrix P 301 having complex numbers a and b. It should be understood that c and s as respectively reduced in Equations 304 and 305 are equivalent to those terms in a conventional Givens rotation.

It should also be understood that modified matrix Q 100 is a unitary Givens rotation matrix, as indicated by Equations 501 and 502 of FIG. 5, where $Q^H$ is the Hermitian transpose matrix of matrix Q, and where I is the identity matrix. Because $Q^H$ equals the inverse of Q, inversion of Q follows from Hermitian transpose of Q. Modified matrix Q 100 is unitary without complex-to-real data reduction, such as by factoring out phase of numbers thereof or other means for such data reduction to real numbers. It should be understood that for larger unitary matrices Q, each such matrix Q may be broken up into m smaller matrices $Q_m^H$ for multiplication with one another as an alternate expression for matrix Q as indicated in Equation 503, where each matrix $Q_i$ thereof is a unitary matrix that nulls out one cell.

The product of the matrix multiplication of FIG. 2 is shown in FIG. 6, as resultant matrix 601, which may be expressed using α as indicated in resultant matrix 602. It should be understood that α is a real number. Thus, all the residual elements of a Givens rotation of a complex matrix, namely a "complex Givens rotation," using modified matrix Q 100 are real numbers. When such complex Givens rotations are used in a matrix triangularization process, all the diagonal elements of the triangularized matrix are real numbers. This is a useful property if the triangular matrix is to be inverted. The process of computing the upper triangular matrix is called "triangularization". Triangularization involves "zeroing out" some cells in the original matrix. For the upper triangular matrix, all the cells below a main diagonal, which are not already zero, may be zeroed out. If the inverse of any matrix is desired, one of the methods involves computing the upper triangular matrix during a process called QR Decomposition ("QRD"). Once the upper triangular matrix is computed, this matrix is inverted by a step called back-substitution. The inverted upper triangular matrix is then used to compute the inverse of the original matrix. In this step of computing the inverse of the upper triangular matrix, it is desirable to have the diagonal elements of the upper triangular matrix as real numbers because this leads to a low complexity solution, as compared to when the diagonal elements are complex numbers. The complex Givens rotation matrix described above leads to all the diagonal elements being real numbers, since at every step the residual element is a real number.

Accordingly, it should be appreciated that using modified matrix Q 100 results in savings in hardware and/or software resources and overall process complexity, even if implemented using one or more DSPs or General-Purpose Processors ("GPPs"). In terms of hardware, computational circuit resources previously used to calculate the angle of the elements in a complex vector and the multiplications (e.g., all the elements in the row of the matrix multiplied by this factor) to factor the phase out are not needed, as complex-to-real data reduction is avoided.

Systolic Arrays

For purposes of clarity and not limitation, nomenclature, including without limitation mathematical expressions, used in the art of systolic arrays for matrix computation is used herein. Even though mathematical expressions are used, it should be understood that such mathematical expressions convey physical relationships. With respect to layout of a systolic array, physical relationships of signal processing cells are conventionally geometrically arranged for purposes of convenience. Along those lines, nomenclature for describing geometrical and positional arrangements signal processing cells of a systolic array conventional includes terms like rows, columns, triangular, diagonal, boundary, internal, and nearest neighbor, among other known terms. Such terms are used herein for purposes of clarity and not limitation, as it should be understood positions and interconnections of signal processing cells of a systolic array are not limited to such geometrical and positional arrangements for carrying out overall operation of systolic array. Accordingly, it should be understood that the topologies described herein are not limiting, as variations of and departures from the topologies described herein may be used.

FIG. 8A is a block diagram depicting an exemplary embodiment of a boundary cell 800 of a systolic array for processing complex numbers. FIG. 8B is a block diagram depicting an exemplary embodiment of an internal cell 810 of a systolic array for processing complex numbers, such as complex vectors. It should be understood that at the interface level, boundary cell 800 and internal cell 810 appear to be like those cells in Gentleman and Kung as disclosed in McWhirter; however, boundary cell 800 and internal cell 810 in contrast to such disclosure in McWhirter are internally configured for processing complex numbers.

FIG. 9 is a block diagram depicting an exemplary embodiment of a systolic array 900 capable of handling complex matrices. Systolic array 900 is formed of boundary cells 800 and internal cells 810 to provide an upper right triangle, such as associated with a least squares solution. A different systolic array can be setup with boundary cells 800 and internal cells 810 for other operations, such as matrix triangularization for example.

Inputs $X_{IN}$ and $Y_{IN}$ are provided to systolic array 900. Operation of systolic array 900, other than internal operation of boundary cells 800 and internal cells 810, follows from the description in McWhirter, and thus is not repeated here for purposes of clarity. It should be understood that even though boundary cell 800 and internal cell 810 can process real numbers, boundary cell 800 and internal cell 810 can directly process complex numbers without having to perform a complex-to-real data reduction and without having to track phase, as does a systolic array formed of boundary cells 700 and internal cells 710.

FIG. 8C is a listing of equations for implementing boundary cell 800 of FIG. 8A. More particularly, this listing of equations depicts an exemplary embodiment of a boundary cell flow 801 for boundary cell 800 of FIG. 8A.

FIG. 8D is a listing of equations for implementing internal cell 810 of FIG. 8B. More particularly, this listing of equations depicts an exemplary embodiment of an internal cell flow 811 for internal cell 810 of FIG. 8B.

With simultaneous reference to FIGS. 8A through 8D, flows 801 and 811 are described in additional detail. At 802, an input value $X_{in}$ is obtained by a boundary cell 800. This input value may be obtained from an input matrix or an $X_{out}$ from an internal cell 810. At 802, it is determined if input $X_{in}$ to a boundary cell 800 is 0 for both real and imaginary components of a complex number. If such input Xin is 0, then at 803, c is set equal to 1 and s is set equal to 0 for storage for modified matrix Q 100, as described below in additional detail with reference to internal cell flow 811.

If, however, $X_{in}$ to a boundary cell 800 is not 0 for either or both a real and an imaginary part of such vector as indicated above, then at 804 a complex conjugate of $X_{in}$ is determined for multiplication with $X_{in}$ at 804. A stored or otherwise obtainable or calculated interim value r, which initially may be set to 0 for an initial Givens rotation, in boundary cell 800 is obtained and squared at 804. It should be understood that depending on size of a matrix being processed, after a number of iterations, a calculated value r is updated and is an accumulation of the squared magnitude of each of the input values up to this point (i.e., if a, b, c, d were the different inputs $X_{in}$ during different iterations, eventually r=|a|^2+|b|^2+|c|^2+|d|^2=aa*+bb*+cc*+dd*, where aa*=|a|^2). The square of r and the result of $X_{in}X_{in}*$ is summed at 804 and a square root of the total is obtained at 804 to provide a value r', which becomes the new or replacement value for r for a next iteration of a Givens rotation in a sequence.

At 805, a value for c is set equal to r/r', and at 806 a value for s is set equal to $X_{in}$/r'. At 807, r' is set equal to r(new), namely r' becomes r(new) for a next iteration. Thus, r' may be stored as r at 807 for a next iteration.

At 808, an $X_{in}$ input value is obtained by an internal cell 810. This input value $X_{in}$ may be a number from an input matrix or an $X_{out}$ of another internal cell.

At 808, a stored value r of such internal cell 810 is obtained. For an initial iteration, r may be set to zero for an internal cell 810. Also at 808, values for c and s, whether set and stored at 803 or determined and stored respectively at 805 and 806, are obtained. Values for c and s are obtained from a boundary cell of a row, which may be passed along down such row to all internal cells thereof as generally indicated in by FIGS. 8A, 8B and FIG. 9 in combination. Still at 808, a −s value is multiplied with r associated with internal cell 810 and a c value is multiplied with $X_{in}$, and the results of the matrix multiplications are added together to provide an $X_{out}$, namely an output number.

At 809, the values for c and s, whether set and stored at 803 or determined and stored respectively at 805 and 806, are obtained and complex conjugates of each are determined or obtained, namely c* and s*. Also at 809, r of such internal cell 810 is obtained for multiplication with c*, and s* is multiplied by $X_{in}$ input to such internal cell 810. Still at 809, the results of the matrix multiplications of c*·r and s*·$X_{in}$ are summed to provide a new value r, namely r(new), which is a replacement value for r for internal cell 810 for a next iteration in a sequence of Givens rotations. It should be understood that equations 808 and 809 represent matrix multiplication of a modified matrix Q 100 with a matrix formed of $X_{in}$ and r values. In FIG. 8B, c and s are shown as inputs and outputs of internal cell 810, namely c and s input to an internal cell may be passed to another internal cell of the same row.

Figure 10:
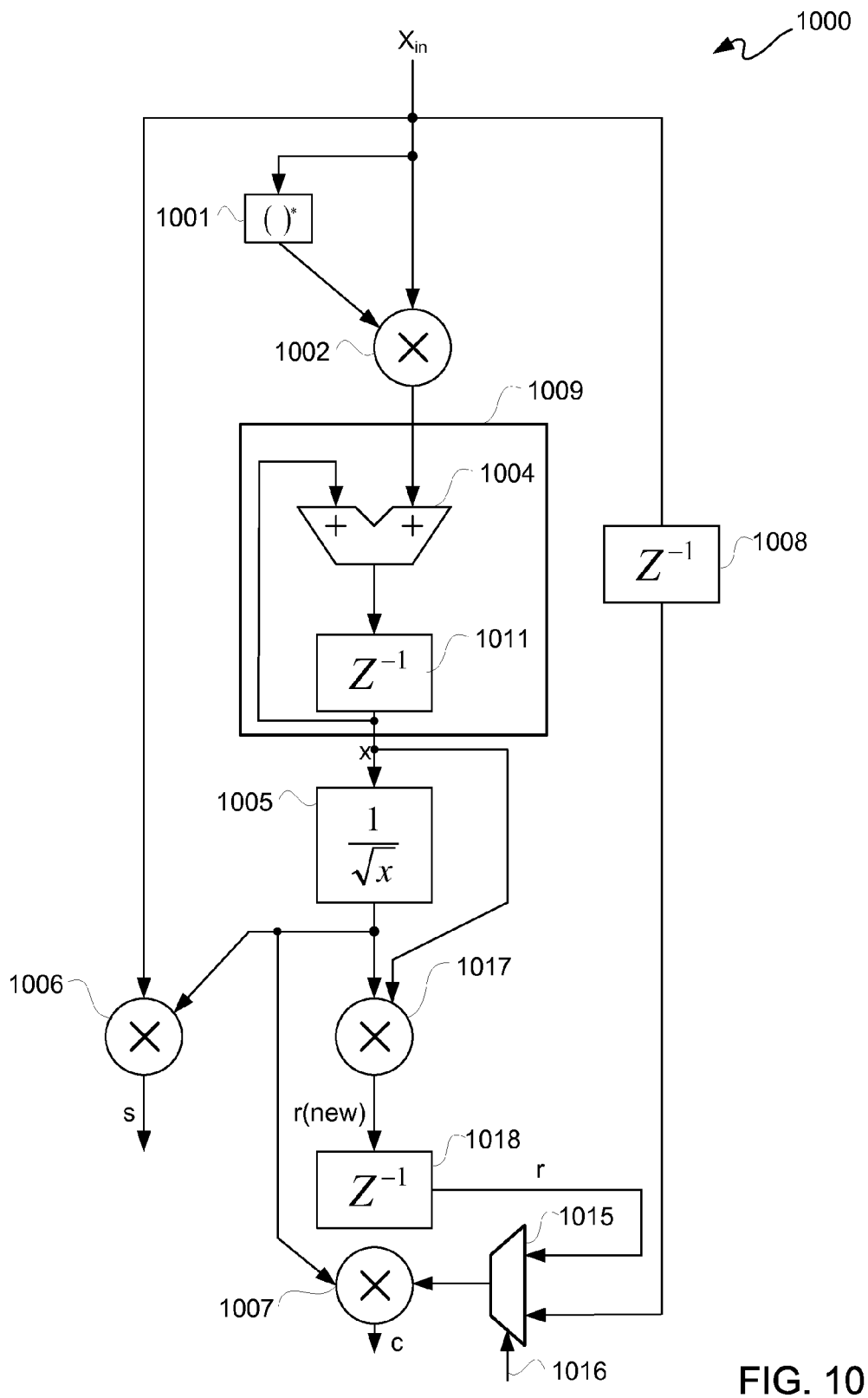
FIG. 10 is a circuit diagram depicting an exemplary embodiment of a boundary cell that may be used for the boundary cell of FIG. 8A for directly processing complex numbers for a Givens rotation.

FIG. 10 is a circuit diagram depicting an exemplary embodiment of a boundary cell 1000 that may be used for boundary cell 800 of FIG. 8A for directly processing complex numbers for a Givens rotation. Boundary cell 1000 receives input $X_{in}$ to complex conjugate block 1001, multipliers 1002 and 1006, and delay 1008. Delay 1008 may be implemented with a clocked register, and other registers may be present as part of an implementation of boundary cell 1000. Registers may be inserted in boundary cell 1000 for storing values and for clocked operation; however, some of such other registers have been omitted here for purposes of clarity as one of ordinary skill in the art would understand insertion of registers and clocking of same for pipelining.

Complex conjugate block 1001 is coupled to generate a complex conjugate of input X. Output of complex conjugate block 1001 is $X_{in}^*$, which is provided to multiplier 1002 for matrix multiplication with $X_{in}$, namely $X_{in}X_{in}^*$.

Output of multiplier 1002 is provided as an input to adder 1004. The output of adder 1004 is fed to a register 1011. The output of register 1011 is fed back as another input to adder 1004. The combination of adder 1004 and register 1011 connected in this manner acts as an accumulator 1009. To avoid taking the square root and then squaring again, a value x output from register 1011 is directly fed back into adder 1004. The output of the register 1011 as previously described for an initial iteration may be set to zero. However, for a subsequent iteration, the output of register 1011 is the result of accumulating the results of $X_{in}X_{in}^*$ of all prior iterations, such as for a sequence of Givens rotations. Thus, output of adder 1004 is generally the sum of $X_{in}X_{in}^*$ for the current iteration and $X_{in}X_{in}^*$ for all such previous iterations.

Inverse square root block 1005 and multiplier 1007 are coupled to receive output x from register 1011. Inverse square root block 1005 is coupled to determine or otherwise obtain the square root of x and to invert such square root value for output. The square root of x was previously described as being r'. Accordingly, output of inverse square root block 1005 is 1/r'.

Output of inverse square root block 1005 is provided as input to multipliers 1006, 1007, and 1017. Output of multiplier 1006 is the product of 1/r' multiplied with $X_{in}$ for a current iteration, namely the $X_{in}$ input for a current iteration. Accordingly, output of multiplier 1006 is s for a modified matrix Q 100.

It should be understood that output c from multiplier 1007 may be real or complex for a modified matrix Q 100, as described below in additional detail. Output of multiplier 1017 is the product of 1/r' multiplied with x from a previous iteration, and this output from multiplier 1017 is r(new). Register 1018 is coupled to receive r(new) output from multiplier 1017. Output from register 1018 is r and is provided as an input to multiplexer 1015, and another input to multiplexer 1015 is output from register 1008. Thus, it should be understood that the output of register 1018 is r from a previous iteration.

Select signal 1016 is an initial iteration or number pair indicator signal, such as when the first 2 values (e.g., [a, b]) are being processed. In other words, a previous iteration input $X_{in}$ output from register 1008 is used when the first pair of values of a sequence of modified Givens rotations is processed responsive to a first state of select signal 1016 for output from multiplexer 1015. For some subsequent iterations of a sequence of modified Givens rotations, r output from register 1018, namely r from a prior iteration, is output from multiplexer 1015 responsive to a second state of select signal 1016. More particularly, for a first and second iteration of a sequence of rotations, c output from multiplier 1007 is the product of 1/r' from inverse square root block 1005 and $X_{in}$ output from register 1008. For third and all subsequent iterations of a sequence of modified Givens rotations, c output from multiplier 1007 is the product of 1/r' from inverse square root block 1005 for a current iteration and r output from register 1018 for a previous iteration.

Figure 11:
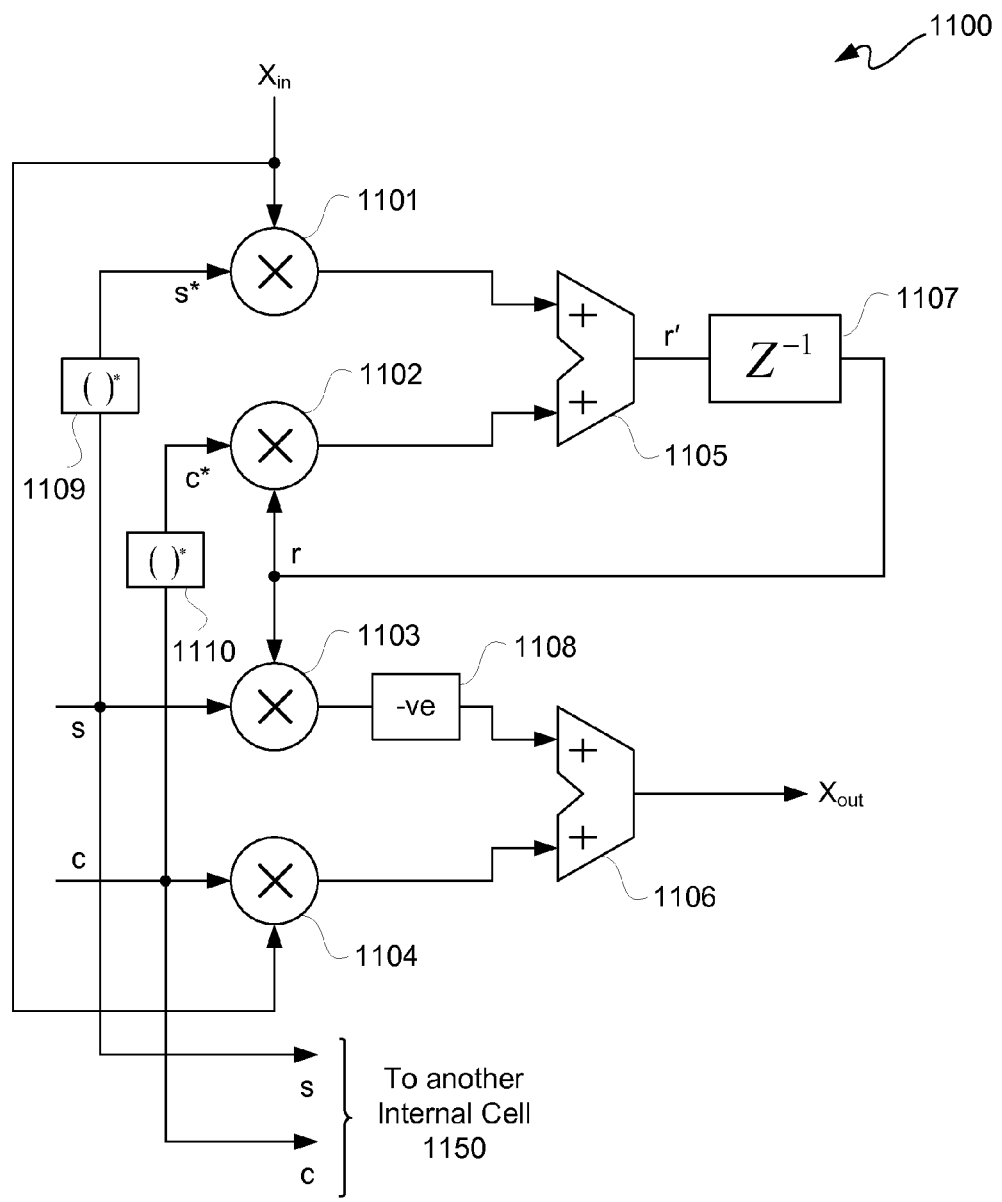
FIG. 11 is a circuit diagram depicting an exemplary embodiment of an internal cell that may be used for the internal cell of FIG. 8B.

FIG. 11 is a circuit diagram depicting an exemplary embodiment of an internal cell 1100 that may be used for internal cell 810 of FIG. 8B. Inputs s and c to internal cell 1100 may be from another internal cell or a boundary cell. Furthermore, such inputs s and c may be provided from internal cell 1100 to another internal cell as generally indicated at 1150. Input $X_{in}$ to internal cell 1100 may be an $X_{out}$ from another internal cell or $X_{in}$ data provided to a systolic array.

$X_{in}$ is provided as an input to multipliers 1101 and 1104. Number s is provided as input to complex conjugate block 1109 and to multiplier 1103. Number c is provided as input to complex conjugate block 1110 and to multiplier 1104. Output of complex conjugate block 1109 is s*, and output of complex conjugate block 1110 is c*.

Again, a number c may be real or complex depending on how c is generated in a boundary cell feeding an internal cell of a systolic array. In the event the number c is real, output of complex conjugate block 1110 is effectively c, namely c* is equal to c for c being a real number instead of a complex number. In the embodiment of boundary cell 1000 of FIG. 10, c may be complex for the first iteration and is real for second and subsequent modified Givens rotations of a sequence thereof. Thus, whether c is real or complex, c is processed by cells 1000 and 1100 for inputs a and b both being complex.

Again, it should be understood that multiplexer 1015 of FIG. 10 outputs a previous input $X_{in}$, which may be zero for the first iteration and which may be complex, for the second iteration for input to multiplier 1007. For the third and subsequent iterations, respective interim values r input to multiplier 1007 are real along with 1/r' from inverse square root block 1005, which means that respective values of c output from multiplier 1007 for third and subsequent iterations of a sequence of rotations are each real numbers.

Output of complex conjugate block 1109 is provided as an input to multiplier 1101 for multiplication with $X_{in}$, and output of multiplier 1101 namely s*·$X_{in}$, is provided as an input to adder 1105. Output of complex conjugate block 1110 is provided as an input to multiplier 1102 for multiplication with r, and output of multiplier 1102, namely c*·r, is provided as another input to adder 1105. Output of adder 1105 is the sum of s*·$X_{in}$ and c*·r, namely r' of Equation 809.

Output of adder 1105 is provided as an input to delay 1107. Delay 1107 may be a register for holding a value of r' from a previous iteration, namely r. On an initial iteration of a sequence of Givens rotations, r may be set to zero.

Output of delay 1107 is provided as an input to multiplier 1102 and to multiplier 1103. As previously described, c* from complex conjugate block 1110 is multiplied with r by multiplier 1102.

Multiplier 1104 multiplies input c with $X_{in}$ for output to an input of adder 1106, where c is an input to internal cell 1100 for a current iteration of a modified Givens rotation. Multiplier 1103 multiplies s input with r stored in delay 1107, where s is an input to internal cell 1100 for such a current iteration of a modified Givens rotation. The output of multiplier 1103 is provided as an input to negation block 1108. Negation block 1108 is coupled to receive s·r from multiplier 1103 and coupled to provide a negative version thereof, namely −s·r, as an output. Output of negation block 1108 is provided as another input to adder 1106. Adder 1106 adds −s·r and the output of multiplier 1104, namely c·$X_{in}$, for providing output $X_{out}$.

It should be understood that functionality described in a boundary cell computes a modified Givens rotation matrix and also may generate a residual value after applying rotation to an original vector. To apply rotation to other columns of a matrix, functionality of an internal cell is used.

It should also be understood that systolic arrays are one means to implement this functionality of modified matrix Q 100. However, functionality of modified matrix Q 100 may be implemented without using a systolic array.

Additionally, cells 1000 and 1100 may be implemented in hardware. While dedicated logic resources may be used for such implementations to form a systolic array, it should be understood that programmable logic devices ("PLDs") may be used. PLDs are well-known types of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 12:
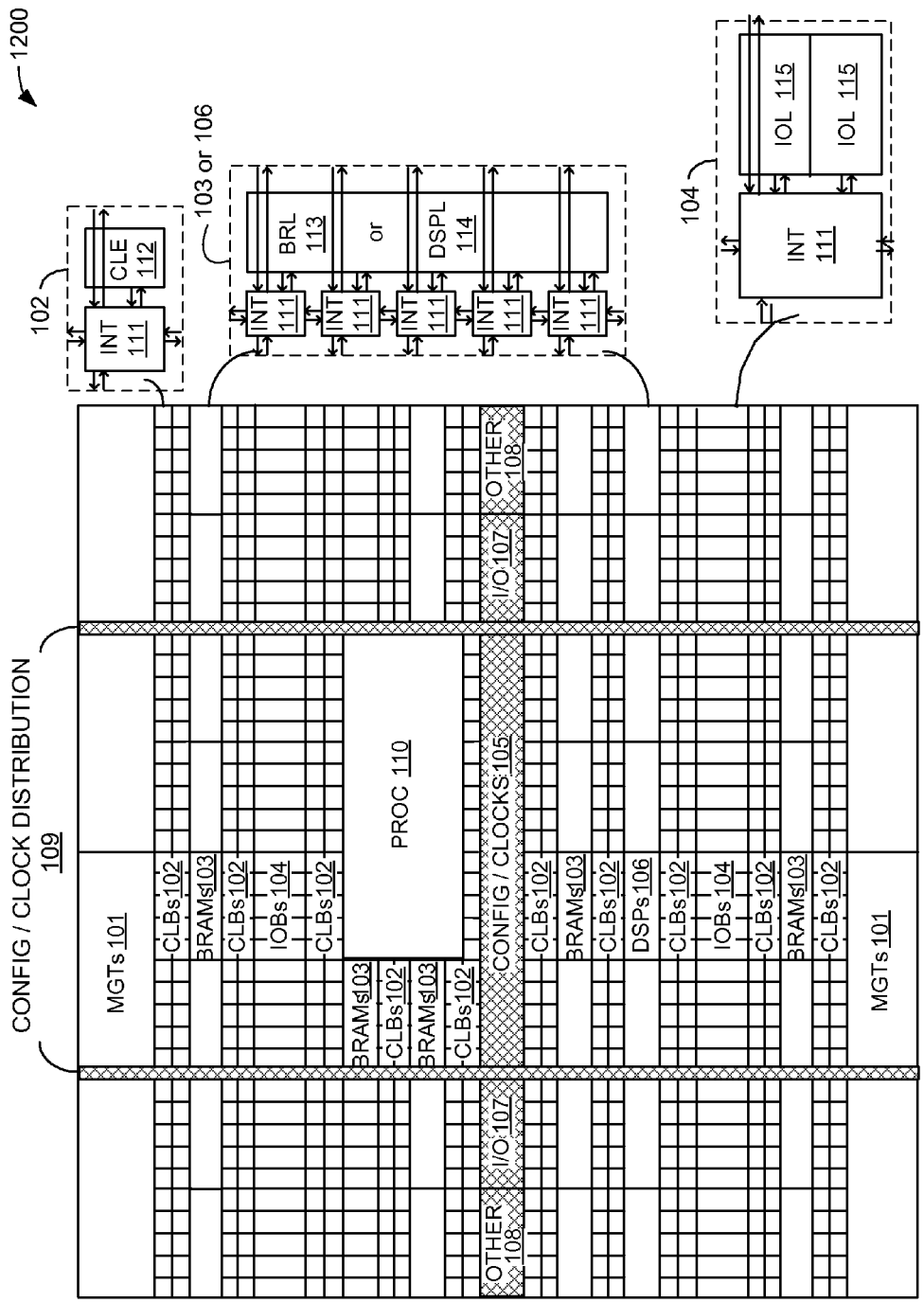
FIG. 12 is a simplified block diagram depicting an exemplary embodiment of a columnar Field Programmable Gate Array ("FPGA") architecture in which one or more aspects of the modified matrix of FIG. 1 may be implemented in the form of a systolic array or otherwise.

FPGAs can include several different types of programmable logic blocks in the array. For example, FIG. 12 illustrates an FPGA architecture 1200 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 12.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 12) is used for configuration, clock, and other control logic. Vertical columns 109 extending from this column are used to distribute the clocks and configuration signals across the breadth of the FPGA.

Some FPGAs utilizing the architecture illustrated in FIG. 12 include additional logic blocks that disrupt the regular columnar structure making up a large part of the FPGA. The additional logic blocks can be programmable blocks and/or dedicated logic. For example, processor block 110 spans several columns of CLBs and BRAMs.

FIG. 12 is intended to illustrate only an exemplary FPGA architecture. For example, the numbers of logic blocks in a horizontal column, the relative width of the columns, the number and order of columns, the types of logic blocks included in the columns, the relative sizes of the logic blocks, and the interconnect/logic implementations included at the top of FIG. 12 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

MIMO System

Figure 13:
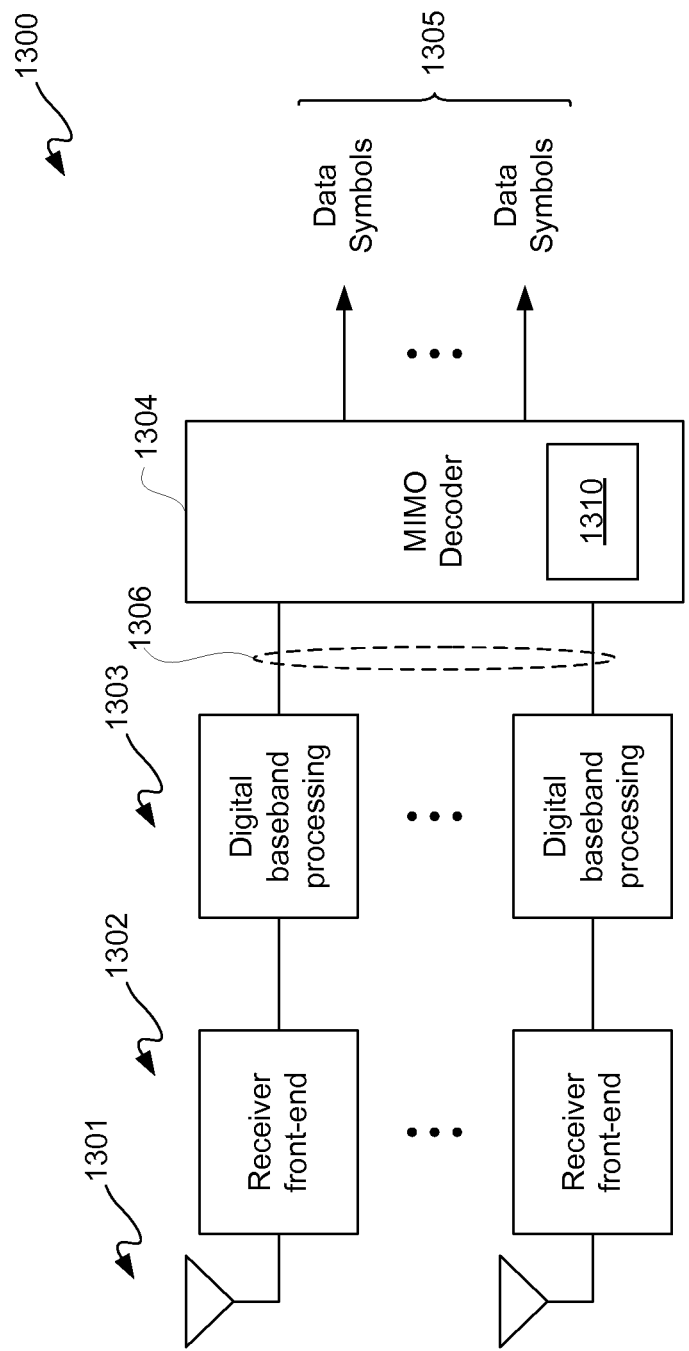
FIG. 13 is a block diagram depicting an exemplary embodiment of a receiver of a Multiple-Input, Multiple Output ("MIMO") system.

Multiple-Input, Multiple Output ("MIMO") decoders in spatial multiplexing MIMO wireless communications systems may use complex matrix operations, such as matrix inversion or QRD that uses matrix triangularization. For all such applications a complex Givens rotation matrix as described herein may be used whether in the form of a systolic array or otherwise. FIG. 13 is a block diagram depicting an exemplary embodiment of a receiver of a MIMO system 1300. Antennas 1301 receive signals respectively for receiver front-ends 1302. Output of receiver front-ends 1302 is respectively provided to digital baseband processors 1303. Output 1306 from digital baseband processors 1303 is provided to MIMO decoder 1304.

MIMO decoder 1304 includes complex Givens rotation block 1310. MIMO decoder 1304 is coupled to decode or resolve outputs from digital baseband processors 1303, namely a transmit signal matrix input 1306. Such decoding or resolving includes complex Givens rotation using complex Givens rotation block 1310. Outputs of MIMO decoder 1304 are data symbols 1305.

Figure 14:
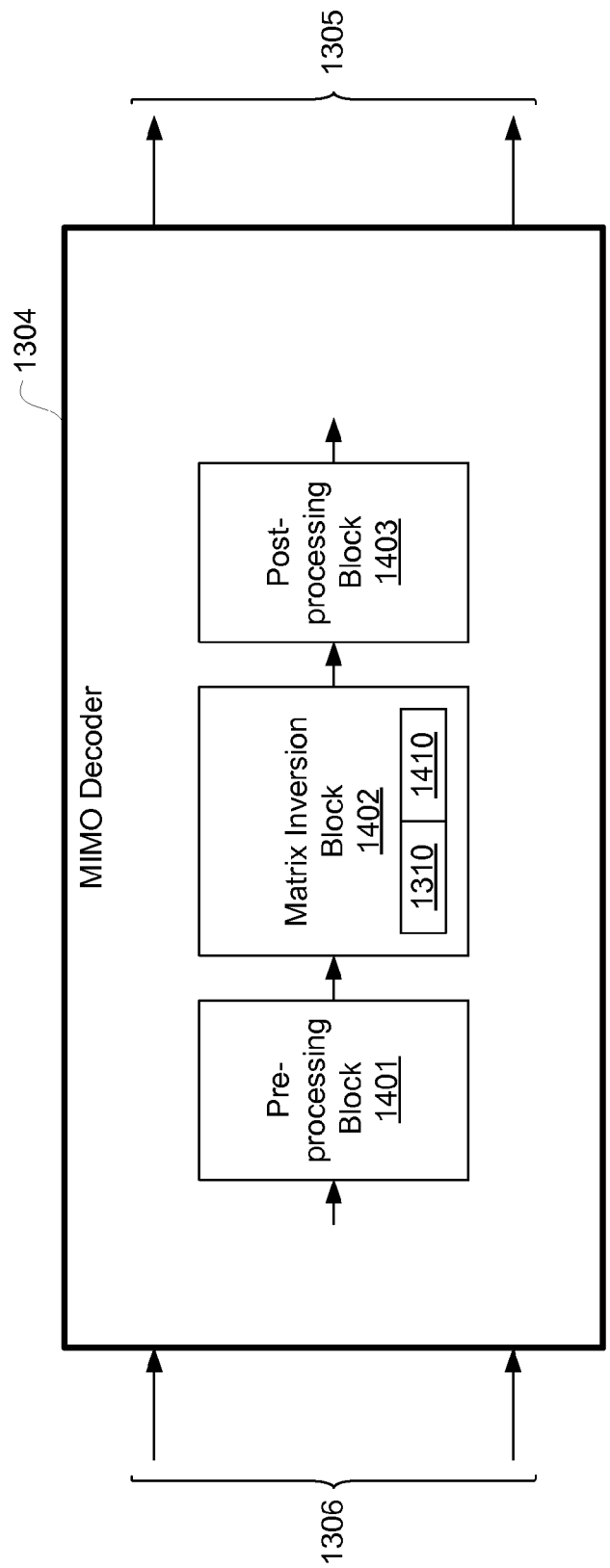
FIG. 14 is a block diagram depicting an exemplary embodiment of a MIMO decoder.

FIG. 14 is a block diagram depicting an exemplary embodiment of MIMO decoder 1304. An output 1306 of outputs 1306 is selected for input to pre-processing block 1401. Output of pre-processing block 1401 is provided to matrix inversion block 1402, which includes complex Givens rotation block 1310. Matrix inversion block 1402 is coupled to perform QRD using complex Givens rotation block 1310. Complex Givens rotation block 1310 may be configured as a systolic array QRD implementation of modified matrix Q 100 coupled to perform triangularization of a transmit signal matrix having complex vectors. Accordingly, it should be understood that such triangularization zeros out imaginary terms of the transmit signal matrix without prior phase factoring by pre-processing block 1401. There is a difference between what is accomplished in pre-processing block 1401 in an MMSE implementation in comparison to a square-root MMSE implementation. Output of matrix inversion block 1402 is provided to post-processing block 1403. Output of post-processing block 1403 is data symbols 1305. More detailed descriptions of some pre-processing and post-processing operations are provided below.

FIG. 15 is a block diagram of an exemplary embodiment of a computer system 1500. Computer system 1500 may include a programmed computer 1510 coupled to one or more display devices 1501, such as Cathode Ray Tube ("CRT") displays, plasma displays, Liquid Crystal Displays ("LCD"), and to one or more input devices 1506, such as a keyboard and a cursor pointing device. Other known configurations of a computer system may be used.

Programmed computer 1510 may be programmed with a known operating system, which may be Mac OS, Java Virtual Machine, Linux, Solaris, Unix, or a Windows operating system, among other known platforms. Programmed computer 1510 includes a central processing unit (CPU) 1504, memory 1505, and an input/output ("I/O") interface 1502. CPU 1504 may be a type of microprocessor known in the art, such as available from IBM, Intel, and Advanced Micro Devices for example. Support circuits (not shown) may include conventional cache, power supplies, clock circuits, data registers, and the like. Furthermore, CPU 1504 may include a single microprocessor or multiple microprocessors for providing a processing unit. Memory 1505 may be directly coupled to CPU 1504 or coupled through I/O interface 1502. At least a portion of an operating system may be disposed in memory 1505. Memory 1505 may include one or more of the following: random access memory, read only memory, magneto-resistive read/write memory, optical read/write memory, cache memory, magnetic read/write memory, and the like, as well as signal-bearing media as described below.

I/O interface 1502 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, I/O interface 1502 may be coupled to a conventional keyboard, network, mouse, display printer, and interface circuitry adapted to receive and transmit data, such as data files and the like. Programmed computer 1510 may be coupled to a number of client computers, server computers, or any combination thereof via a conventional network infrastructure, such as a company's Intranet and/or the Internet, for example, allowing distributed use for interface generation.

Memory 1505 may store all or portions of one or more programs or data to implement processes in accordance with one or more aspects of the invention to provide QRD with Givens rotation of complex numbers using a modified Givens rotation matrix ("program product") 1515 as described elsewhere herein. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product 1515, as well as documents thereof, may define functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD). The above embodiments specifically include information downloaded from the Internet and other networks. Such signal-bearing media, when carrying computer-readable instructions that direct functions of one or more aspects of the invention, represent embodiments of the invention.

Back-Substitution

In the above-description, a modified Givens rotation matrix was described for complex matrices, where such modified Givens rotation matrix may be used for matrix triangularization. Such matrix triangularization may be implemented with a systolic array. Such modified Givens rotation matrix may be used to provide QRD, where such QRD may be used in a decoder of MIMO system.

Inversion of a complex matrix may include triangularization followed by back-substitution. With regard to MIMO decoder 1304 of FIG. 14, while complex Givens rotation block 1310 may use another systolic array configured only for back-substitution, such additional systolic array dedicated to back-substitution may consume a significant amount of additional circuit resources than if the same systolic array used for triangularization is also used for back-substitution as described herein.

In the following description, back-substitution is described using the above-described systolic array implemented for a modified Givens rotation matrix; however, inputs to boundary and internal cells are multiplexed. In other words, with the addition of multiplexers, the same systolic array used for triangularization of a complex matrix may be used for back-substitution. Accordingly, it should be understood that a modified systolic array as described below in additional detail may be used as part of a complex Givens rotation block 1310, whether implemented in a MIMO decoder or other application of complex matrix triangularization and subsequent inversion of such upper triangularized matrix. Furthermore, it should be understood that FPGA multiplexer resources may be used to provide a modified systolic array without consuming additional division, multiplication, or accumulation resources. In such an FPGA implementation, DSP resources may be used along with field programmable logic resources.

Assuming a matrix A is an input matrix and such input matrix A is to be triangularized, then a matrix R may be obtained as an upper triangular matrix of matrix A. Such triangularization of matrix A may be performed as part of a QRD resulting in a matrix R and a Unitary matrix Q (the same as shown in FIG. 5) as a result of a series of Givens rotations of matrix A. As matrix Q is not used in back-substitution, it is not described in unnecessary detail with respect thereto. To invert such an upper triangular matrix R, back-substitution is used.

FIG. 16 is a flow diagram depicting an exemplary embodiment of a back-substitution flow 1600. Elements $r_{ij}$ are elements of matrix R for i rows and j columns, where i and j are positive integers greater than zero. Elements $W_{ij}$ are elements of an inverse matrix of upper triangular matrix R, namely matrix W.

Flow 1600 may be used for matrix inversion using a linear array or a triangular array which is combined with a transpose matrix of matrix Q, namely $Q^H$, to obtain an inverse of an original input matrix A. For each element of the matrix R, flow 1600 is applied. Equations 1602 and 1603 indicate actions taken when the conditions are met by each of the elements of matrix R. From Equation 1601 it should be appreciated that multiplication and accumulation, such as by repetitive addition and storage for accumulation, may be used to perform back-substitution. From Equation 1603, it should be appreciated that division may be used for such back-substitution. From the following description, it should be understood that resources associated with a conventional implementation of flow 1600, for example in the form of an additional systolic array dedicated to back-substitution configured for division, multiplication, and accumulated addition, are avoided.

In the following description, back-substitution is described using the above-described systolic array implemented for a modified Givens rotation matrix; however, inputs to boundary and internal cells are multiplexed. The same inputs could be used as well, but during the back-substitution flow the value at the input is changed appropriately. In other words, with or without the addition of multiplexers, the same systolic array used for triangularization of a complex matrix may be used for back-substitution. Accordingly, it should be understood that a modified systolic array as described below in additional detail may be used as part of a complex Givens rotation block 1310, whether implemented in a MIMO decoder or other application of complex matrix triangularization and inversion. Furthermore, it should be understood that FPGA multiplexer resources may be used to provide a modified systolic array without consuming additional DSP resources, such as for division, multiplication, or additive accumulation.

With reference to FIG. 17, input matrix A 1701, upper triangular matrix R 1702 of input matrix A 1701, and the inverse of matrix R 1702, namely matrix W 1703 are shown as four-by-four matrices. It should be understood that other sizes of matrices may be used in accordance with the following description. Again, matrix Q is not shown here as it has no consequence with respect to back-substitution. However, it should be understood that matrix Q obtained after QRD may be stored in memory external to systolic array.

In the following description it will be understood that each boundary cell and each internal cell has two modes. In one mode, namely a triangularization mode, a systolic array formed of boundary and internal cells performs triangularization. In another mode, namely a back-substitution mode, such systolic array performs back-substitution. The triangular mode was previously described, and thus is not repeated.

After triangularization, data flow via inputs and outputs of cells of a systolic array are switched for back-substitution as described below. Output of such a systolic array is an upper triangular matrix W 1703, which is the inverse of matrix R 1702. Multiplexers are added to a systolic array to manipulate data flow as between a triangularization mode and a back-substitution mode. However, it should be understood that the depiction of multiplexers is for purposes of clarity and not limitation. In another implementation, such multiplexers may be omitted in favor of additional routing to obtain a same result. Thus, it should be understood that with or without the addition of multiplexers very few additional resources are added to cells of a systolic array in order for performing back-substitution, as well as maintaining capability for performing triangularization.

For systolic array, it should be understood that the first column of matrix A 1701 is fed into a first column of a systolic array, which may be a single boundary cell. Likewise, second, third, and fourth columns of matrix A are respectively fed into second, third, and fourth columns of such a systolic array. It should be further understood that row of input from matrix A may be clocked into a first or input row of a systolic array on a clock cycle. Thus, for example, each row of input matrix A may be clocked into a systolic array using associated clock cycles.

Because matrix W 1703 is the inverse of matrix R 1702, and because both matrices R and W are upper triangular matrices, the diagonal elements of matrix W 1703 may be associated with the inverse of a corresponding element in matrix R 1702 as indicated by Equation 1800 of FIG. 18. Moreover, values for elements of matrix R 1702 are determined by cells in a systolic array during the computation of a rotation matrix Q, namely during triangularization of matrix A 1701. Elements of matrix R are values calculated during triangularization that are stored, such as in registers, in a systolic array. It should be understood that Equation 1800 is effectively identical to Equation 1603 and that the $r_{ij}$ in Equation 1603 is the same as "$a_{ij}$ double_bar" in Equation 1800.

For purposes of clarity by way of example and not limitation, assume that only input values a11 and a21 are being processed. FIG. 19 is a listing of equations depicting an exemplary embodiment for computation of only input values a11 and a21 of matrix A 1701 for determining matrix R 1702. FIG. 19 may be thought of as the same as FIG. 8C, but with some different variable names. Along those lines, the variable label $X_{in}$ is replaced with the variable label a, and the variable label r is replaced with the variable label r1. Accordingly, Equation 804 of FIG. 8C is the same as Equation 2111 of FIG. 21B. For purposes of clarity, some description is not repeated. These values can be complex or real numbers as generally indicated by magnitudes in Equation 1901 of FIG. 19.

At 1901, a variable r1 is determined as the square root of the sum of the magnitude squares of a11 and a21 from matrix A. A result of a rotation may be one cell with a logic 0 and another cell having a value of r1, where r1 is described as the square root of the sum of magnitude squares. A variable, namely "ir1," may be set equal to the inverse of r1 as indicated in Equation 1902. An interim value for a value a11 may set equal to r1 as indicated in Equation 1905, and r1 is the same r1 as in Equation 1901. An interim value for a value a21 is zero, as indicated in Equation 1906. The value of ir1 after the triangularization flow is complete for all the elements of matrix A 1701, gives the value of W11 as shown in Equation 2001 in FIG. 20. Thus, it should be appreciated that in providing an upper triangular matrix R, residue from triangularization may be used for determining an inverse matrix of matrix R, namely matrix W, as part of back-substitution.

Figures 21A, 21B, 21C:
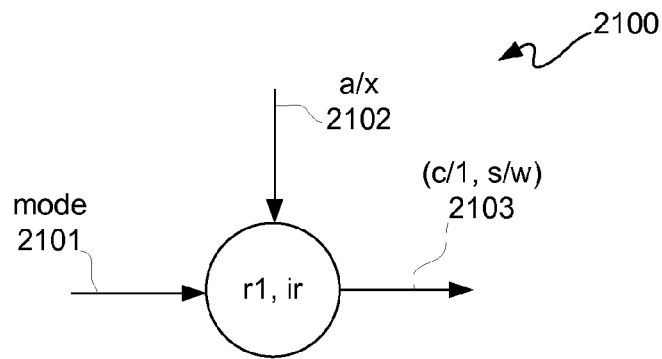
FIG. 21A is a block diagram depicting an exemplary embodiment of a dual-mode boundary cell.
FIGS. 21B and 21C are respective listings of equations depicting respective exemplary embodiments of modes of the boundary cell of FIG. 21A for a triangularization mode and a back-substitution mode, respectively.

FIG. 21A is a block diagram depicting an exemplary embodiment of a dual-mode boundary cell 2100. Dual-mode boundary cell 2110 may be implemented in a systolic array configured for performing triangularization when in a triangularization mode and for performing back-substitution, such as for inversion, when in a back-substitution mode.

Dual-mode boundary cell 2100 receives a mode signal input, namely mode signal 2101, for selecting between a triangularization mode and a back-substitution mode. FIGS. 21B and 21C are respective listings of equations depicting respective exemplary embodiments of modes of boundary cell 2100 of FIG. 21. Listing of Equations 2110 is for boundary cell 2100 operating in a triangularization mode, and listing of Equations 2120 is for boundary cell 2100 operating in a back-substitution mode. With simultaneous reference to FIGS. 21A through 21C, dual-mode boundary cell 2100 is further described.

For purposes of clarity by way of example and not limitation, a triangularization mode is defined as a mode signal 2101 being a logic 0, and for a back-substitution mode, mode signal 2101 is defined as being a logic 1. It should be understood that Equations 2110 have previously been described even though some variables have been relabeled for indicating an inverse of a triangularization residue, namely inverse residue ("ir") 2112 of Equation 2112, and a square root of the sum of the magnitude squares value r' for a square of a currently stored triangularization value r1 in boundary cell 2100 and an input value a, as indicated in Equation 2111. It should be understood that a a* is equal to $|a|^2$. An updated value of r in a triangularization mode for boundary cell 2100 is as previously described, except that an r1 variable has been substituted in order to delineate dual-mode operation of boundary and internal cells in comparison to a triangularization mode-only implementation.

An input to boundary cell 2100 in a triangularization mode is input a of input 2102. Input a 2102 is obtained either from an internal cell immediately above boundary cell 2100 in a systolic array, or, if boundary cell 2100 is an upper leftmost boundary cell in a systolic array, then boundary cell 2100 receives input from a first column of matrix A 1701. In a back-substitution mode, input 2102 is input x to boundary cell 2100. The inputs x and a may share the same input port and are labeled differently here only for purposes of clarity for explanation. The same is true of the other inputs as well, such as s and w as described below.

For boundary cell 2100 being an upper leftmost boundary cell, input x 2102 is a logic 1 for satisfying a condition of flow 1600 of FIG. 16. Thus, it should be understood the "/" in FIG. 21A is to indicate that in boundary cell 2100, input 2102 alternates between a and x and output 2103 alternates between c and 1 and between and w, with respect to a triangularization mode and a back-substitution mode, respectively. It should be understood that r stored in boundary cell 2100 is the same r as previously described, and such repeated description is avoided for purposes of clarity. It should further be understood that it 2112 is stored in boundary cell 2100 as a residue of a completed triangularization as defined in Equation 2122. In the triangularization mode, output of boundary cell 2100 is c and s, namely rotation vectors c and s as previously described. In a back-substitution mode, output of boundary cell 2100 is a logic 1 and w, where such outputs are respectively associated with ports for c and s of a triangularization mode.

In other words, output 2103 of boundary cell 2100 in a triangularization mode is rotation vectors c and s. However, in a back-substitution mode, output 2103 is a logic 1, generally associated with a port for rotation vector c, and a w, generally associated with a port for rotation vector s.

Output w is generated as indicated in Equation 2121, namely variable ir stored in boundary cell 2100 multiplied by an input x 2102 to boundary cell 2100 in a back-substitution mode. Again, ir is the inverse of a residue from triangularization, and such ir is stored in boundary cell 2100 as a residue from triangularization. As values of r1 and ir are stored in boundary cell 2100, such as from a prior triangularization, in a back-substitution mode boundary cell 2100 obtains a stored value of ir and multiplies such stored value with an input x for producing an output w. Accordingly, it should be understood that a multiplier previously used for triangularization is used for producing w of output 2103, and thus resource reuse of such multiplier is provided by a dual-mode systolic array.

Figures 22A, 22B, 22C:
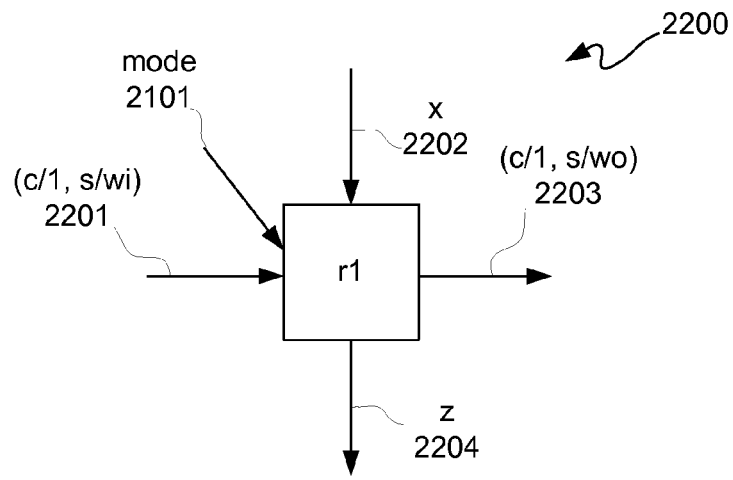
FIG. 22A is a block diagram depicting an exemplary embodiment of a dual-mode internal cell.
FIGS. 22B and 22C are respective listings of equations depicting respective exemplary embodiments of the internal cell of FIG. 22A for a triangularization mode and a back-substitution mode, respectively.

FIG. 22A is a block diagram depicting an exemplary embodiment of a dual-mode internal cell 2200, and FIGS. 22B and 22C are respective listings of equations depicting exemplary embodiments of internal cell 2200 of FIG. 22A for a triangularization mode and a back-substitution mode, respectively. Equations 2210 are associated with a triangularization mode of operation of internal cell 2200, and Equations 2220 are associated with a back-substitution mode of operation of internal cell 2200. Again, for mode signal 2101 equal to a logic 0, a triangularization mode is invoked, and for mode signal 2101 equal to a logic 1, a back-substitution mode is invoked. Dual-mode internal cell 2200 is further described with simultaneous reference to FIGS. 22A through 22C.

In a triangularization mode, input 2201 to internal cell 2200 is rotation vectors c and s, as previously described. However, in a back-substitution mode, input 2201 to internal cell 2200 is a logic 1 generally associated with a c port and a w-input ("wi") generally associated with an s port. Internal cell 2200, like boundary cell 2100, receives mode signal 2101 for switching between a triangularization mode and a back-substitution mode. An input x 2202 is provided as an input to internal cell 2200. Input x 2202 may be from an input vector or from another cell, as described below in additional detail.

Outputs of dual-mode internal cell 2200 are output 2203 and output 2204. Output 2203 in a triangularization mode are rotation vectors c and s, as previously described with respect to input 2201. However, in a back-substitution mode, outputs of output 2203 are a logic 1 as indicated in Equation 2223 and a w-output ("wo") as indicated in Equation 2222. It should be understood that in contrast to boundary cell 2100, which calculates a value for w by multiplication, internal cell 2200 passes wi of input 2201 as wo of output 2203. This equality as between wi and wo is indicated in Equation 2222. Thus it should be understood that values associated with a c port and an s port of internal cell 2200 are passed through; in other words, input 2201 is equivalent to output 2203. Though the c port and the s port could be the same as the wi port and the wo ports, they are shown separately for purposes of clarity.

Output z 2204 in a triangularization mode is as previously described, and is not repeated here for purposes of clarity. Likewise, an updated value of r in a triangularization mode for internal cell 2200 is as previously described, except that an r1 variable has been substituted in order to delineate dual-mode operation of boundary and internal cells in comparison to a triangularization mode-only implementation.

In a back-substitution mode, output z 2204 is defined in Equation 2221, where input wi 2201, a stored value r1, and an input x 2202 are used for determining z. In a back-substitution mode, c is equal to a logic 1. Accordingly, c is set to a logic 1 in boundary cell 2100 for such back-substitution mode. Input c to internal cell 2200 is anything that comes from a left neighboring cell on a same row, which for a back-substitution mode happens to be a logic 1 since c is set to a logic 1 in an associated boundary cell 2100 of such row. Accordingly, it should be understood that output z 2204 changes with x and with wi. However, r1, as well as ir, for a back-substitution mode does not change.

Figure 23:
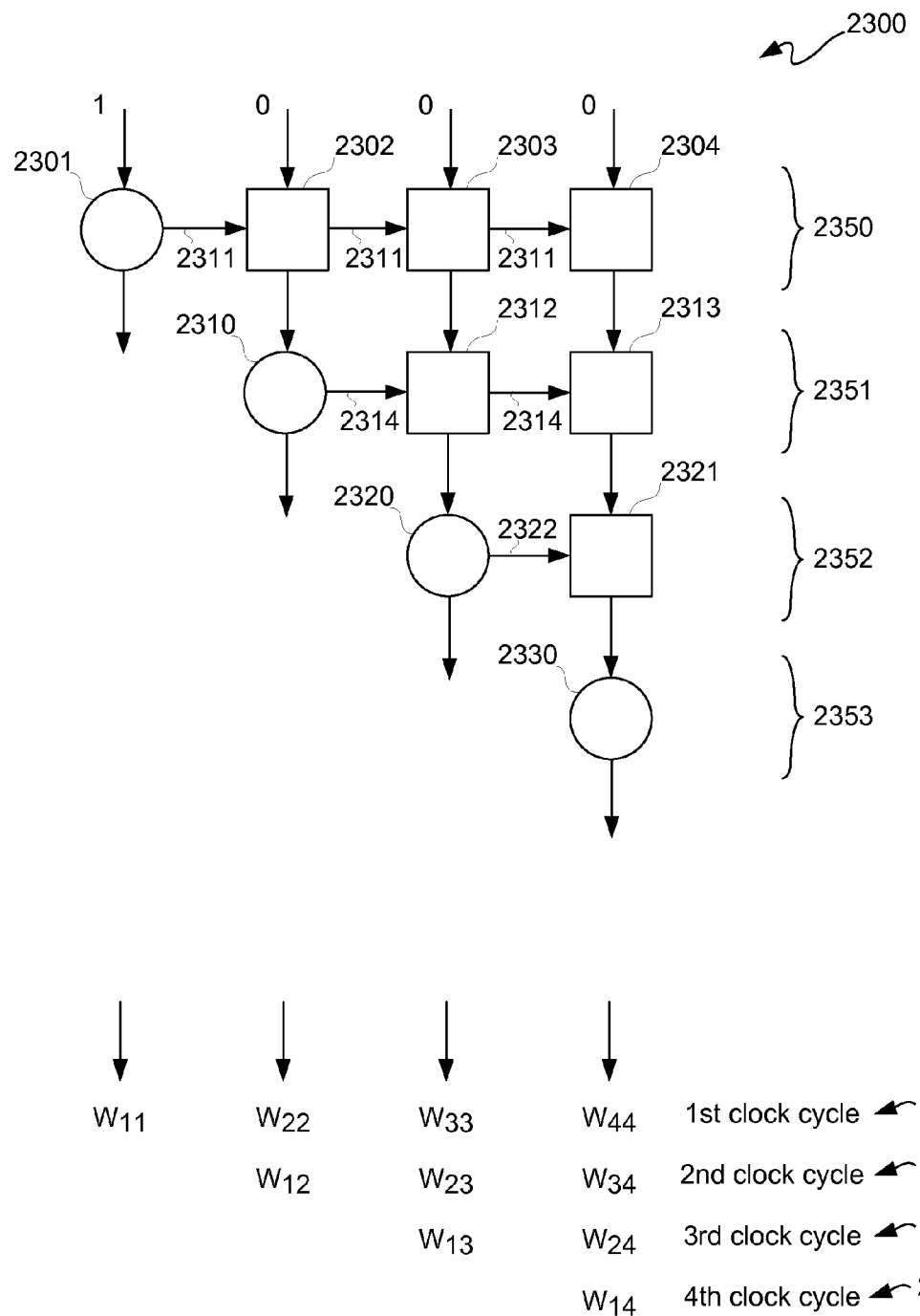
FIG. 23 is a block diagram depicting an exemplary embodiment of a systolic array configured in a back-substitution mode.

FIG. 23 is a block diagram depicting an exemplary embodiment of a systolic array 2300 configured in a back-substitution mode. In this exemplary embodiment, systolic array 2300 is an upper right triangular array; however, other orientations may be used. In a back-substitution mode, a top row of systolic array, namely row 2350, has constant values for inputs x, as indicated as being in a downward direction. For purposes of convenience, orientation of inputs is described; however, it should be understood that actual implementation may have a different orientation, furthermore it should be understood that smaller or larger systolic array sizes may be implemented.

A first boundary cell 2301 receives as its x input a logic 1 in a back-substitution mode. Accordingly, output of boundary cell 2301 is a constant value, $W_{11}$ as generally indicated by arrows 2311 for output w. This value is the inverse value of a corresponding residue in matrix R, namely as expressed in equation 2001 of FIG. 20. $W_{11}$ as generally indicated by arrows 2311 is passed to the right to internal cell 2302. As each of internal cells 2302 through 2304 of row 2350 passes a wi to a wo, $W_{11}$ is passed from boundary cell 2301 to internal cell 2302, then from internal cell 2302 to internal cell 2303, and then from internal cell 2303 to internal cell 2304 in this example embodiment.

As each of internal cells 2302 through 2304 receives a fixed logic 0 for its x input in a back-substitution mode, it should be understood that internal cells on an uppermost row of the systolic array, as well as a boundary cell in such row, all have their inputs multiplexed for switching between a triangularization mode and a back-substitution mode. However, input x for internal cells 2200 not on an input row is the same input data flow for both triangularization and back-substitution modes, namely from an output z of another internal cell. It should be understood that in a circuit implementation, internal cell 2200 need not have two inputs multiplexed provided that the input value during a back-substitution mode is set to a logic 1.

As logic 0 inputs to internal cells 2302 through 2304 do not affect outputs z thereof, each output z is the negative of the product of $W_{11}$ multiplied by the r1 value, plus x which is zero, stored in each of internal cells 2302 through 2304. It should be understood that the r1 value for cells of systolic array 2300 is previously determined during triangularization. In other words, the r1 value is stored as a residue of a triangularization mode. Accordingly, such r1 value does not have to be recalculated, but rather it is a respective constant for the internal cell in which it is stored. Of course, the r1 value may be different for different internal cells.

A second boundary cell 2310 outputs $W_{22}$ associated with a first clock cycle, where $W_{22}$ is indicated in Equation 2002 of FIG. 20. Boundary cell 2310 passes $W_{22}$ to internal cell 2312 of row 2351, and internal cell 2312 passes $W_{22}$ to internal cell 2313 of row 2351 in this exemplary embodiment. In other words, as generally associated with a first clock cycle, each internal cell of row 2351 receives $W_{22}$ from boundary cell 2310 as generally indicated by arrows 2314, and each internal cell of row 2350 receives $W_{11}$ from boundary cell 2301 as generally indicated by arrows 2311. It should be understood that by a "first clock cycle," it is meant generally a first clock cycle of operation, which may include more than one cycle of a clock. Thus, for example, W propagates horizontally to more than one internal cell of row 2351; however, it may take more than one cycle of a clock for a first clock cycle of information to be output from row 2351.

Likewise, boundary cell 2320 generates output $W_{33}$ as generally associated with a first clock cycle, and boundary cell 2330 generates output $W_{44}$ as generally associated with a first clock cycle. As generally associated with a first clock cycle of operation, boundary cell 2320 passes $W_{33}$ to internal cell 2321 of row 2352 as generally indicated by arrow 2322. In this exemplary embodiment, there is no internal cell of row 2353.

Even though no downward directed arrow was illustratively depicted for boundary cell 2100 of FIG. 21A, it should be understood that systolic array 2300 has output arrows depicted for describing the state of such boundary cells during a sequence of clock cycles 2361 through 2364 for purposes of clarity. Furthermore, it should be understood that the residue of a systolic array after triangularization, namely matrix R 1702 of FIG. 17 and associated inverted values thereof, are stored in systolic array 2300. In other words, triangularization may be used to condition systolic array 2300 for back-substitution.

Thus it should be understood that in a back-substitution mode, an input s port associated with internal cells of systolic array 2300 is used to receive $W_{ij}$ values. These $W_{ij}$ values are multiplied by a value r1 stored in an associated cell. Thus, generally in cell 2302 for example, the value $\overline{a12}$ is stored in systolic array 2300 after triangularization. Output z of such internal cell therefore is the value as indicated in Equation 2004 of FIG. 20 for such cell a12. This output value z for internal cell 2302 being cell a12, the value z output is multiplied by $W_{22}$ in boundary cell 2310 immediately below internal cell 2302 in a same column thereof. This multiplication is for obtaining the value $W_{12}$. Thus generally on a second clock cycle 2362, boundary cells 2310, 2320, and 2330 respectively output $W_{12}$, $W_{23}$, and $W_{34}$ values. Generally for a third clock cycle 2363, boundary cells 2320 and 2330 respectively output $W_{13}$, and $W_{24}$ values, and generally for a fourth clock cycle 2364, boundary cell 2330 outputs $W_{14}$. It should be understood that boundary cell 2301 always outputs $W_{11}$.

Accordingly, it should be understood that $W_{11}$, $W_{22}$, $W_{33}$, and $W_{44}$ for a first clock cycle 2361 are readily obtained from boundary cells 2301, 2310, 2320, and 2330, respectively. This is because the residue values in those boundary cells from a prior triangularization, namely a value, ir, are already calculated. Thus, such stored values within such boundary cells may be directly multiplied with an input value. As input x on a first iteration to all boundary cells, such as boundary cells 2301, 2310, 2320, and 2330, is a logic 1, the multiplication of a logic 1 with ir already stored readily allows the output of values $W_{11}$, $W_{22}$, $W_{33}$, and $W_{44}$ for a first clock cycle 2361. As described below in additional detail, each internal cell is coupled to be set to store a logic 1, and this stored logic 1 is used for output z for a first cycle of operation.

On a second clock cycle 2362 for boundary cell 2310, for example, output z from internal cell 2302 is input x to boundary cell 2310. Thus, boundary cell 2310 multiplies the value output from internal cell 2302 in a downward flow direction by the inverse residue stored in boundary cell 2310, which for a second clock cycle 2362 is output $W_{12}$. Accordingly, boundary cells 2310, 2320, and 2330, respectively output $W_{12}$, $W_{23}$, and $W_{34}$ on a second clock cycle 2362. Thus while the stored values of internal cells may not change, output values of such internal cells may change with response to a change in either wi or x. On a third clock cycle 2363, boundary cells 2320 and 2330 respectively output $W_{13}$ and $W_{24}$, and on a fourth clock cycle 2364 boundary cell 2330 outputs $W_{14}$.

Figure 24A:
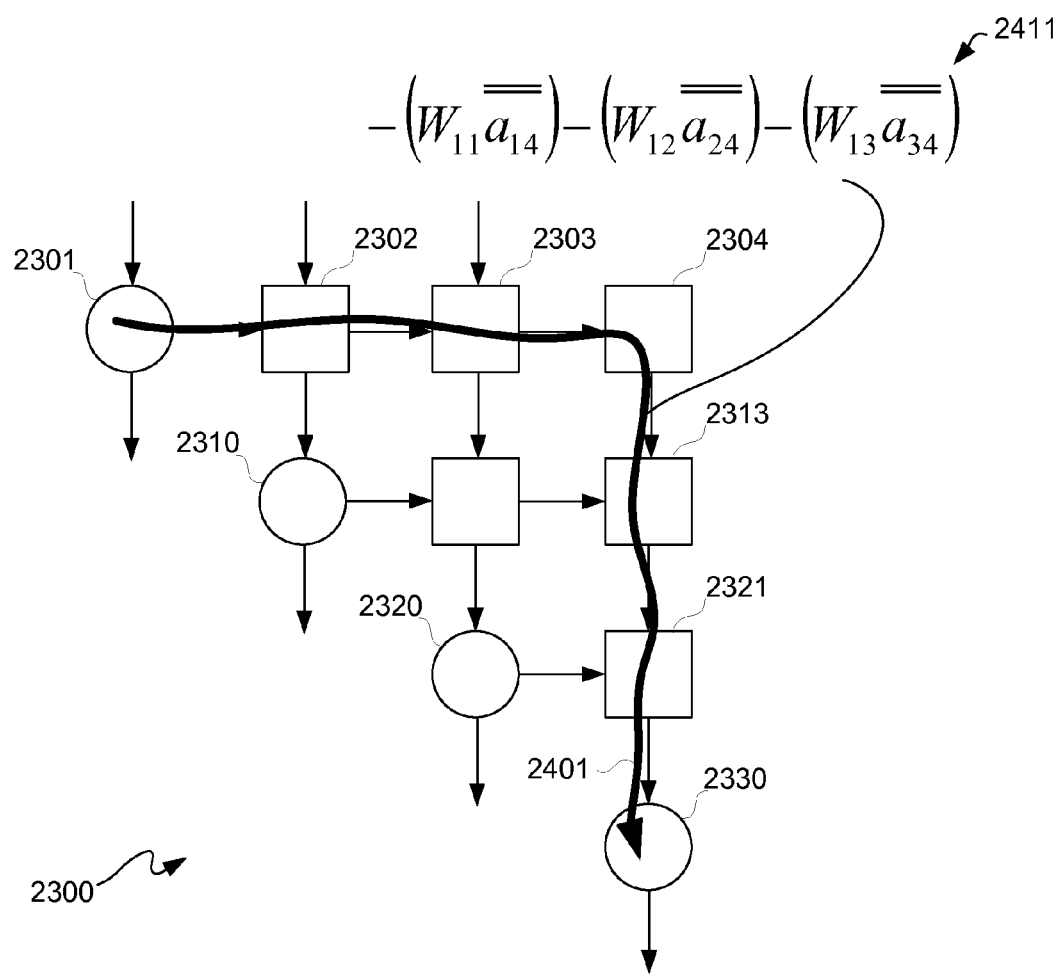
FIGS. 24A through 24C are the block diagram of FIG. 23 depicting examples of calculations performed by the systolic array of FIG. 23 for various clock cycles.
Figure 24B:
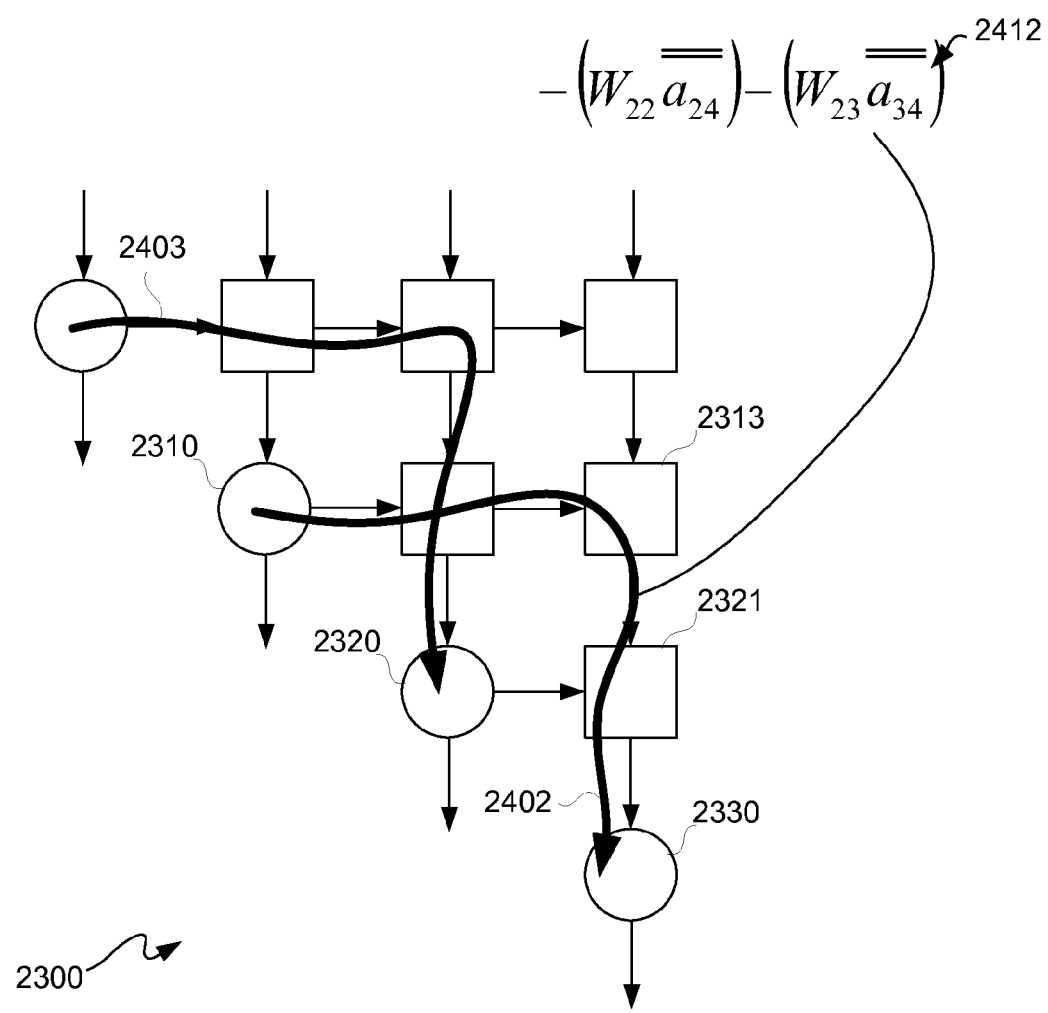
Figure 24C:
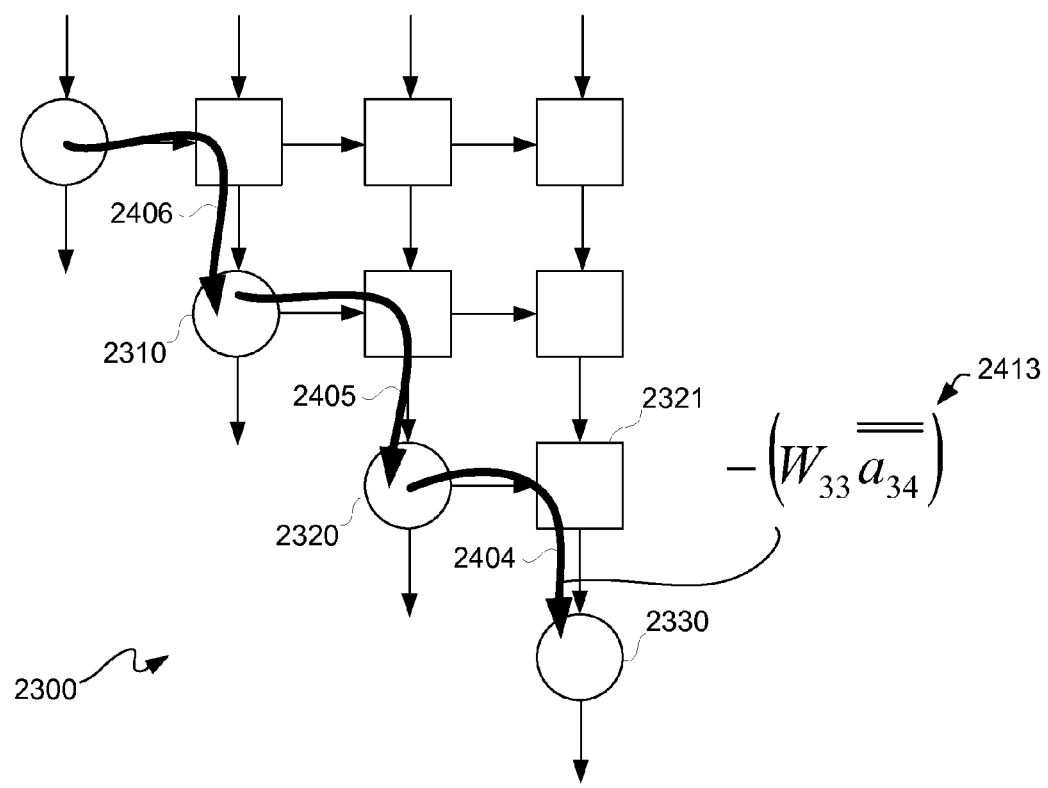

To further understand the sequence of calculations and flow of values within systolic array 2300, FIGS. 24A through 24C are the block diagram of FIG. 23 depicting examples of calculations performed by systolic array 2300 for various clock cycles.

With reference to FIG. 24A, data path 2401 from boundary cell 2301 to boundary cell 2330 via internal cells 2302, 2303, 2304, 2313, and 2321 in such sequence provides a calculation as indicated in Equation 2411, where $\overline{a14}$ is obtained from internal cell 2304 and $W_{11}$ is obtained from boundary cell 2301. Furthermore, $W_{12}$ is obtained from boundary cell 2310, and $\overline{a24}$ is obtained from internal cell 2313. Lastly, $W_{13}$ is obtained from boundary cell 2320, and $\overline{a34}$ is obtained from internal call 2321. It should be understood that values $W_{11}$, $W_{12}$, and $W_{13}$ are generated from clock cycles 2361 through 2363, respectively to provide an output $W_{14}$ on a fourth clock cycle 2364 associated with the calculated value of Equation 2411.

In FIG. 24B, data paths 2402 and 2403 are illustratively depicted with Equation 2412 being for data path 2402. For data path 2402, $W_{22}$ is obtained from boundary cell 2310 on a first clock cycle 2361, and $\overline{a24}$ is obtained from internal cell 2313. $W_{23}$ is obtained from boundary cell 2320 on a second clock cycle 2362, $\overline{a34}$ is obtained from internal cell 2321. On a third clock cycle 2363, boundary cell 2330 outputs the result of the calculation associated with Equation 2412 as $W_{24}$. It should be understood that value $W_{23}$ output from boundary cell 2320 is affected by a calculation performed associated with data path 2403, namely an input x associated therewith provided to boundary cell 2320. As an equation for data path 2403 follows from the description of Equation 2412, an equation for data path 2403 is not described in unnecessary detail herein for purposes of clarity.

In FIG. 24C, data paths 2404 through 2406 are illustratively depicted, with Equation 2413 being associated with data path 2404. $W_{33}$ is obtained from boundary cell 2320 on a first clock cycle, and $\overline{a34}$ is obtained from internal cell 2321 for input; the result of which is provided to boundary cell 2330 for output as $W_{34}$ on a second clock cycle. Likewise, equations for values respectively input to boundary cells 2310 and 2320 via data paths 2406 and 2405 follow from the above description, and are not described in unnecessary detail herein for purposes of clarity. Result 2413 going into cell 2330 is multiplied by $W_{44}$ in cell 2330 to get a final result $W_{44}$ for cell 2321 (i.e., $W_{34}=-(W_{33}\cdot\overline{a34})W_{44}$).

Figure 25:
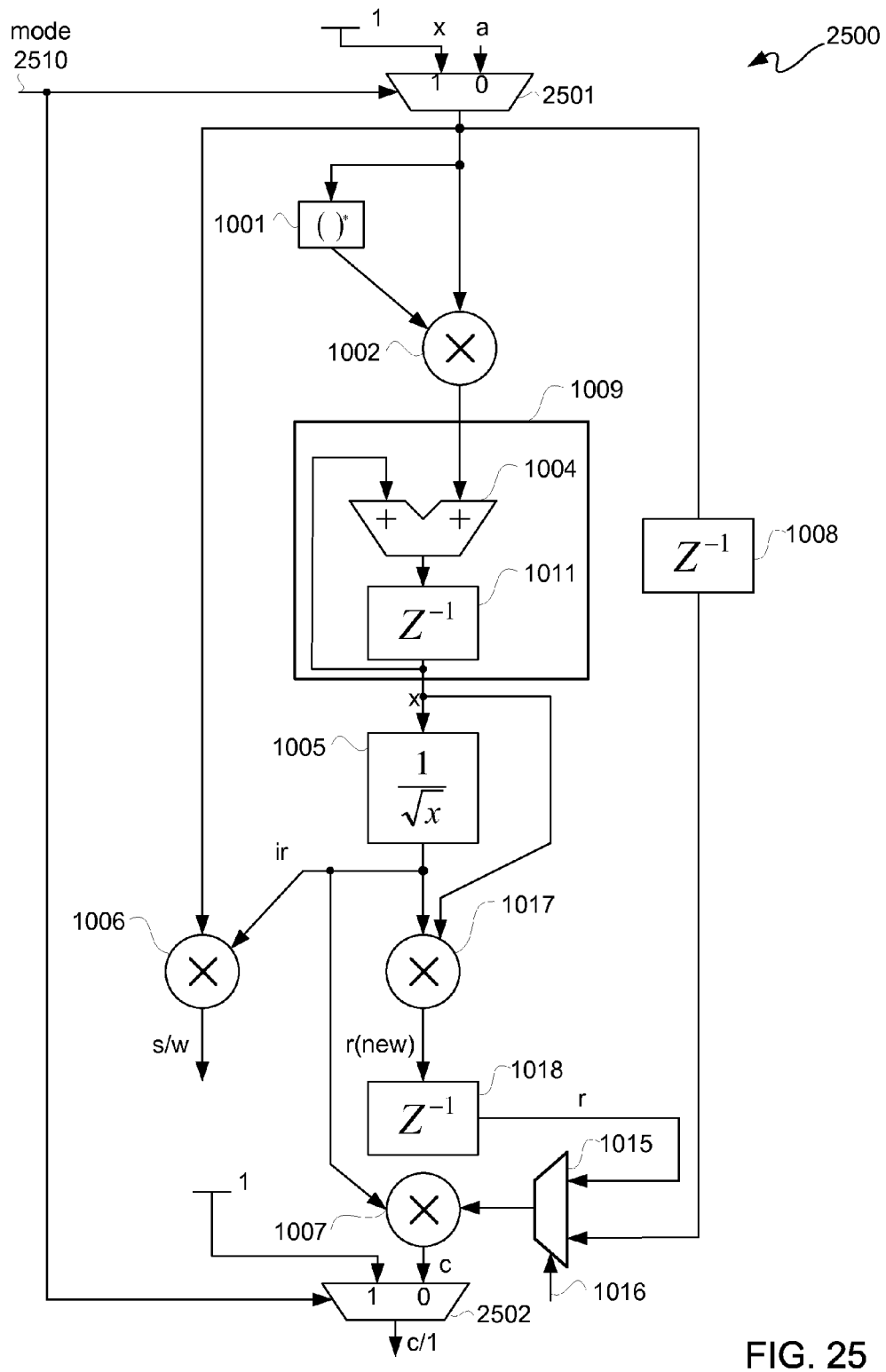
FIG. 25 is a circuit diagram depicting an exemplary embodiment of a dual-mode boundary cell.

FIG. 25 is a circuit diagram depicting an exemplary embodiment of a dual-mode boundary cell 2500. It should be understood that boundary cell 2500 has some same components as boundary cell 1000 of FIG. 10, and accordingly generally only the differences are described for purposes of clarity and not limitation.

A multiplexer 2501 is added as an input multiplexer. Multiplexer 2501 is coupled to receive a mode signal 2510 as a control select signal for switching between a triangularization mode and a back-substitution mode. In the triangularization mode, continuing the above example, mode signal 2510 is a logic 0, and accordingly input a is selected for output by multiplexer 2501 as an input to boundary cell 2500. For boundary cell 2500 being in an input row of a systolic array, input a is from an input matrix, such as matrix A, for a triangularization mode. Again, it should be understood that input multiplexer 2501 may be omitted. Accordingly, a same input x may be used for both inputs x and a. Thus, during triangularization mode an input matrix A is fed through a systolic array for processing, and during a back-substitution mode a logic 1 is fed into a first boundary cell, such as boundary cell 2100 of FIG. 21A. Likewise, it should be understood that output multiplexer 2502 may be omitted. Multiplexers are used for purposes of clarity for understanding that in different modes, different values may be fed, and thus it should be understood that in an implementation one or more of such multiplexers may or may not be present.

For a back-substitution mode, mode signal 2510 is a logic 1, and accordingly multiplexer 2501 selects input x as an input to boundary cell 2500. For boundary cell 2500 being in a first or input row of a systolic array, input x is a logic 1 for a back-substitution mode. As previously described with reference to FIG. 23, an uppermost row or input row of a systolic array, such as systolic array 2300, has fixed inputs. A fixed input to a boundary cell in such row is a logic 1.

However, it should be understood that boundary cell 2500 may be in a second or other non-input row of a systolic array. As previously described with reference to FIG. 22A, an internal cell has different outputs depending on whether a triangularization mode or a back-substitution mode is invoked. In other words, output z 2204 of FIG. 22A has separate calculations performed depending on which mode is invoked, as indicated in the separate Equation listings 2210 and 2220. Thus during a triangularization mode, input a to boundary cell 2500 may be output z from an internal cell in accordance with Equation 2211 of FIG. 22B, and in a back-substitution mode, input x may be an output z from an internal cell as indicated by Equation 2221 of FIG. 22C.

Multiplexer 2501 may be omitted from boundary cell 2500, and thus boundary cell 2500 may be repeated for all other boundary cells in a systolic array. In other words, it should be understood that only the first boundary cell of a systolic array, namely on an input row of a systolic array, may be configured with or without a multiplexer for receiving a logic 1 in a back-substitution mode, as all other boundary cells therebelow do not have such configuration in this regard. It should further be understood that input x/a are one and the same input but taken in different set of values during the two different modes, namely a triangularization mode and a back-substitution mode. Likewise, the same is true for multiplexer 2601 and inputs x1/x2 of FIG. 26 for an input row of a systolic array, as described below in additional detail.

For purposes of clarity and not limitation, it shall be assumed that input x to multiplexer 2501 is tied to a logic 1 as illustratively depicted in FIG. 25 for a boundary cell 2500 of the first input row of a systolic array, and for all other boundary cells 2550, it shall be assumed that multiplexer 2501 is omitted such that all such boundary cells 2500 have an input a which is the same node as input x. However, both a and x terms are used to distinguish between different calculations.

Mode signal 2510 is provided to output multiplexer 2502 of boundary cell 2500 as a control select signal. Multiplexer 2502 is coupled to receive an output c, where such c output was previously described with reference to FIG. 10. Another input to multiplexer 2502 is coupled to a logic 1 value. Thus in a triangularization mode, output from multiplexer 2502 responsive to mode signal 2510 is rotation vector c, and in a back-substitution mode, output from multiplexer 2502 is a logic 1.

Input to multiplier 1006 is output from input multiplexer 2501 for a boundary cell 2500 of an input row of a systolic array. In a back-substitution mode, input to multiplier 1006 is a logic 1 output from multiplexer 2501 for multiplication with it as output w. For a boundary cell 2500 not of an input row of a systolic array, input to multiplier 1006 is output z from an internal cell 2200, which is input x of such non-input row boundary cell 2500 for a back-substitution mode.

Figure 26:
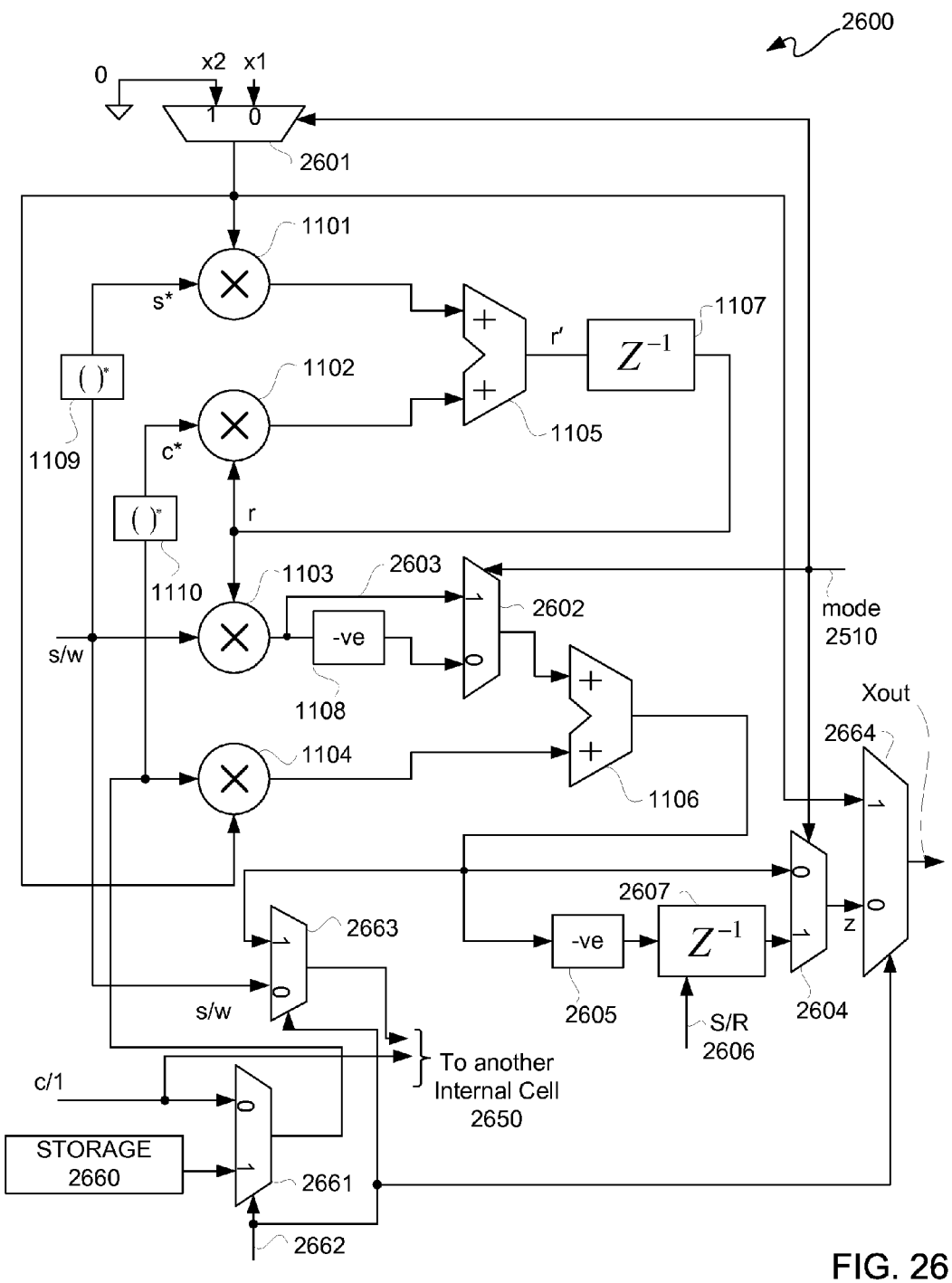
FIG. 26 is a circuit diagram depicting an exemplary embodiment of a dual-mode internal cell.

FIG. 26 is a circuit diagram depicting an exemplary embodiment of a dual-mode internal cell 2600. As internal cell 2600 has some of the same components as internal cell 1100 as previously described with reference to FIG. 11, generally only the differences are described for purposes of clarity and not limitation.

For internal cell 2600 being in a first or input row of a systolic array, an input multiplexer 2601 is included. Mode signal 2510 is provided as a control select input to input multiplexer 2601. Input multiplexer 2601 passes an input x1 from an input matrix, such as matrix A of FIG. 17, to multipliers 1101 and 1104 in a triangularization mode, and passes an input x2, which is a logic 0, to multipliers 1101 and 1104 in a back-substitution mode. For internal cell 2600 not in an input row of a systolic array, multiplexer 2601 may be omitted and accordingly input x1 may be provided directly to multipliers 1101 and 1104 from an internal cell output z, which as previously described has different calculations depending on selected mode.

Again, it should be understood that input multiplexer 2601 may be omitted provided that input to internal cells of an input row of a systolic array are coupled to receive a logic 0 input during a back-substitution mode. Moreover, it should be understood that multiplexers are depicted for purposes of showing how inputs change for different modes. However, it should be understood that input multiplexers may be omitted such that each boundary cell is the same configuration as every other boundary cell and each internal cell is the same configuration as every other internal cell. Thus, a feature of a systolic array where all cells are the same configuration of their counterpart cells is modularity. Modularity generally facilitates deployment, as building blocks may more readily be interconnected. Thus, it should be understood that for a back-substitution mode, input to a systolic array is different from in a triangularization mode, which for purposes of clarity and not limitation is depicted with a multiplexer, which may or may not be implemented for such input.

Internal cell 2600 is coupled to a boundary cell of a same row either directly or through another internal cell 2600 to receive s and c rotation vectors respectively to multipliers 1103 and 1104 in a triangularization mode, where rotation vector c is output from multiplexer 2502 of a boundary cell 2500 and where rotation vector s is output from multiplier 1006 of such a boundary cell 2500. In a back-substitution mode, internal cell respectively receives w and a logic 1 as inputs to multipliers 1103 and 1104, respectively. A logic 1 is sourced from an output of multiplexer 2502 of a boundary cell 2500 of a same row of a systolic array as internal cell 2600, and w is sourced from an output of multiplier 1006 of such boundary cell 2500.

Each internal cell 2600 is coupled to pass s/w and c/1 from a boundary cell of a same row in a systolic array as such internal cell 2600 to a nearest neighbor internal cell 2650 of such same row. A last internal cell 2600 may thus be coupled to output s/w and c/1 such a row of such systolic array. Each internal cell of the same row of a systolic array thus receives s/w and c/1 from a boundary cell 2500 of such row responsive to a triangularization/back-substitution mode, respectively. Inputs s/w and c/1 are respectively provided to multipliers 1103 and 1104 of internal cell 2600 for a triangularization/back-substitution mode, respectively.

Mode signal 2510 is provided as a control select signal to interim multiplexer 2602 of internal cell 2600. As previously described for a triangularization mode, negative block 1108 is used. However, for back-substitution, negating the output of multiplexer 1103 is not performed, and this bypass is generally indicated as bypass path 2603. In other words, output from multiplier 1103 is directly provided as an input to multiplexer 2602 and directly provided for negating as an input to block 1108. Output of block 1108 is provided as another input to multiplexer 2602. In a triangularization mode, output of block 1108 is selected as output from multiplexer 2602 for input to adder 1106, and in a back-substitution mode output of multiplexer 2606 is the direct output of multiplier 1103.

Output from multiplexer 2602 is provided to an input port of adder 1106. An output of adder 1106 is provided as an input to output multiplexer 2604 and to negative block 2605. In a triangularization mode, mode select signal 2510, which is provided as a control select signal to output multiplexer 2604, selects output of adder 1106 as output z of multiplexer 2604 of internal cell 2600.

Output of adder 1106 provided to negative block 2605 is negated, and the output of negative block 2605 is provided to register 2607. Output of register 2607 is provided as an input to output multiplexer 2604. In a back-substitution mode, output of register 2607 is selected as output z of output multiplexer 2604 of internal cell 2600. It should be understood for example from Equation 2003 of FIG. 20 that the result of the multiplication is negated, and negative block 2605 provides such change in sign. Prior to operation of a systolic array, register 2607 is initialized to a logic 1 value, as on a first clock cycle output z is a positive logic 1, as previously described. Accordingly, a set/reset signal 2606 may be used for setting register 2607 to a logic 1 for such first clock cycle operation.

Accordingly, it should be appreciated that output multiplexer 2604 represents two different calculations depending on whether an internal cell 2600 is operating in a triangularization mode or is operating in a back-substitution mode in accordance with dual-mode capability of such internal cell.

Left Matrix Multiplication

In the above description, a modified Givens rotation matrix was described for complex matrices, where such modified Givens rotation matrix may be used for matrix triangularization. Such matrix triangularization may be implemented with a systolic array coupled to provide the above described modified Givens rotation.

In the above description, back-substitution using a dual-mode systolic array, namely configured for a modified Givens rotation matrix for triangularization and for back-substitution to invert a triangularized matrix, was described. More particularly, such back-substitution may be used for inverting a matrix R, from a modified Givens rotation matrix implemented with a systolic array for QRD, to produce an inverted matrix W. Moreover, such a dual-mode systolic array may be implemented in a complex Givens rotation block 1301 of a MIMO decoder 1304 of FIG. 14. By adding multiplexers to a systolic array, to make such systolic array capable of operating in a triangularization mode and a back-substitution mode by changing data paths, as well as some modification of circuitry for providing calculations for back-substitution, systolic array reuse, namely use for triangularization and back-substitution, is provided as described herein.

After triangularization and back-substitution, a MIMO decoder may perform a transpose, such as with transpose block 1410 of FIG. 14, for matrix multiplication of matrix W or $R^{-1}$ with a transpose of matrix Q. As Q is a unitary matrix, a Hermitian transpose of Q ("$Q^H$") may be obtained by generating a complex conjugate of matrix Q, namely Q*, followed by a main-diagonal transpose of matrix Q* to provide matrix $Q^H$. While the following left matrix multiplication is described in terms of the above description of a systolic array configured for performing a modified Givens rotation and a back-substitution, it should be appreciated that the following description of left matrix multiplication is applicable to any triangularized matrix. More particularly, any upper right triangular matrix, whether provided as a triangular matrix, or triangularized from an input matrix, may be used. However, for purposes of clarity by way of example and not limitation, left matrix multiplication is described herein as part of performing a transpose for MIMO decoding, wherein a MIMO decoder has a dual-mode systolic array configured for performing a modified Givens rotation and a back-substitution.

To recapitulate, matrix inversion based on QRD involves triangularizing an input matrix A, such as using modified Givens rotations as described herein to compute a Q matrix and an R matrix. The R matrix is an upper triangular matrix. Once an input matrix A is triangularized, an inverse of such upper triangular matrix R is determined by back-substitution. The inverse matrix $R^{-1}$ is multiplied by a transpose of matrix Q to obtain an inverse of an original input matrix A. Again, a systolic array, such as systolic array 2300, may be employed to both triangularize an input matrix A to provide an upper triangular matrix R and for back-substitution to determine matrix $R^{-1}$.

Figure 27:
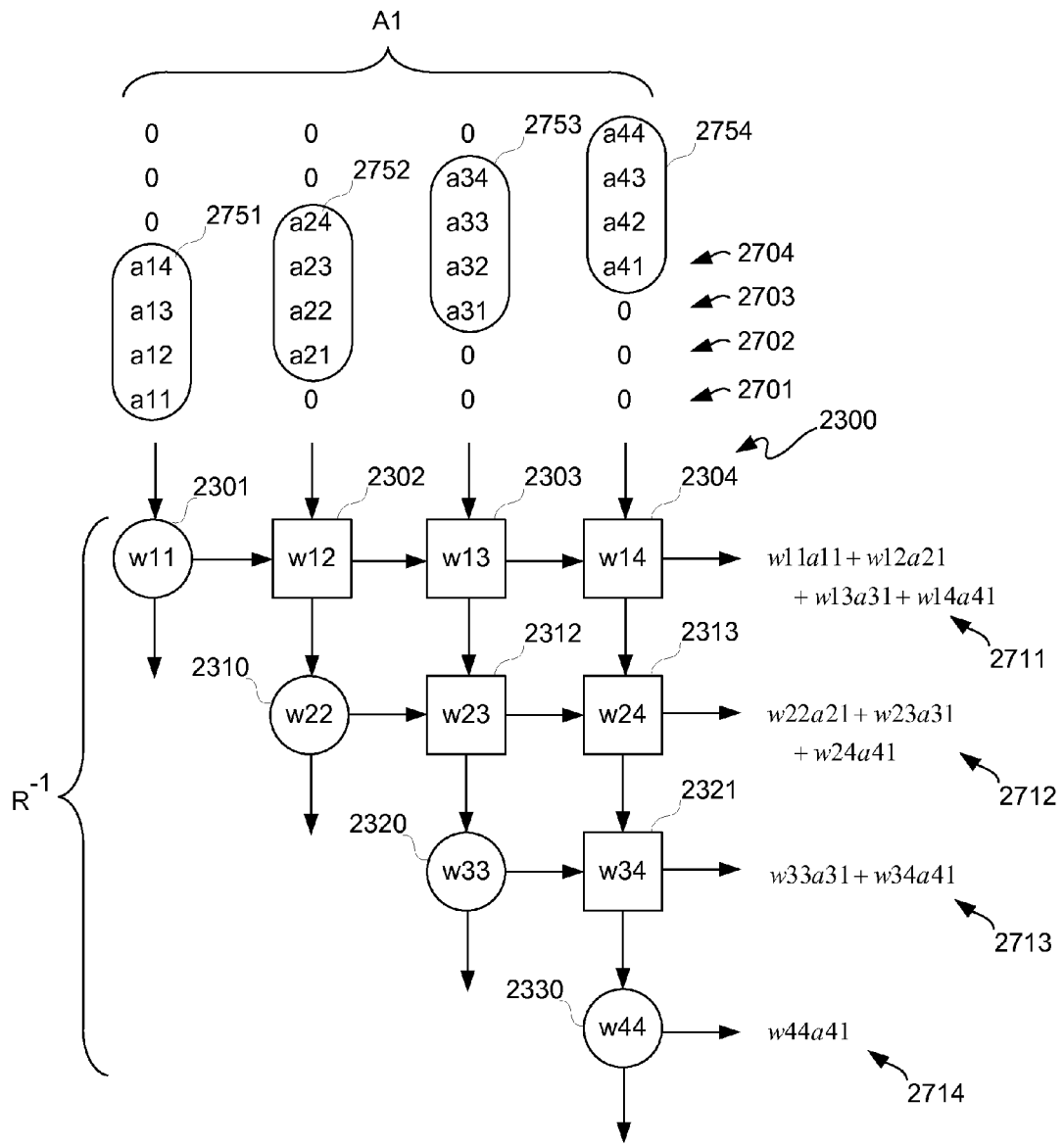
FIG. 27 is a block diagram depicting an exemplary embodiment of the systolic array of FIG. 23 after back-substitution receiving an input matrix for right matrix multiplication.

FIG. 27 is a block diagram depicting an exemplary embodiment of systolic array 2300 after back-substitution receiving an input matrix A1 for right matrix multiplication with matrix $R^{-1}$. In FIG. 27, matrix A1 is input to systolic array 2300. Systolic array 2300 after back-substitution is configured as upper right triangular matrix $R^{-1}$. Accordingly, boundary cells 2301, 2310, 2320, and 2330 respectively have w11, w22, w33, and w44 values associated with matrix $R^{-1}$ 1703 of FIG. 17. Likewise, internal cells 2302, 2303, 2304, 2312, 2313, and 2321 respectively have values w12, w13, w14, w23, w24, and w34, as associated with matrix W or $R^{-1}$ 1703 of FIG. 17.

It should be understood that matrix A1 elements are clocked into an input row, namely an uppermost row in the depicted embodiment, of systolic array 2300, and systolic array 2300 after back-substitution has stored therein an upper right triangular matrix $R^{-1}$. A first row 2751 of matrix A1, which is oriented in a vertical direction for input, is clocked into an upper leftmost boundary cell 2301 of an input row, which is a first column of matrix $R^{-1}$. A second row 2752 of matrix A1 is clocked into internal cell 2302 for a second column of matrix $R^{-1}$, and a third row 2753 of matrix A1 is clocked into internal cell 2303 for a third column of matrix $R^{-1}$. Lastly, for the depicted exemplary embodiment, a fourth row 2754 of matrix A1 is clocked into internal cell 2304 for a fourth column of matrix $R^{-1}$.

However, due to clock delays, zero padding is used for the calculations to be performed directly. Accordingly, a first input row 2701 for input of matrix A1 is a11, 0, 0, 0 as respectively input to cells 2301 through 2304. Furthermore, a second input row 2702 for input of matrix A1 includes values a12, a21, 0, 0, respectively input to cells 2301 through 2304. A third input row 2703 for input of matrix A1 is a13, a22, a31, 0 as respectively input to cells 2301 through 2304. A fourth input row 2704 for input of matrix A1 does not include any zero padding in the depicted exemplary embodiment; however, input rows after row 2704 do include zero padding in the depicted exemplary embodiment.

Accordingly, rows 2751 through 2754 of matrix A1 may be input as staggered with zero padding for multiplication. On a right side of systolic array 2300 output from such multiplication may be obtained. Equations 2711 through 2714 indicate respective results from rows of systolic array 2300.

Thus, after a sufficient number of clock cycles, results associated with Equations 2711 through 2714 may be obtained on a right side of systolic array 2300. It should be understood that a boundary cell, such as boundary cell 2500 of FIG. 25, after back-substitution as previously described, has stored in register 1011 a value, which after obtaining the inverse square root of such registered value by inverse square-root block 1005 of FIG. 25 produces an inverse residue value, such as w11 for example, for multiplication with an input, such as a11 for example, by multiplier 1006 for producing an output, such as a result of w11*a11. Accordingly, such result output from boundary cell may be sourced from output port s. Such boundary cell 2500 directly receiving input for matrix A1 may be in a triangularization mode. For purposes of clarity by way of example and not limitation, all of systolic array 2300 may be assumed to be put in a triangularization mode for such right matrix multiplication. As a side, it should be understood that systolic array can be "loaded" with any upper triangular matrix, whether or not obtained from triangularization via such systolic array.

For an internal cell, such as internal cell 2600 of FIG. 26, after back-substitution as previously described, has stored a value, such as value w12. Input a21 is provided to multiplier 1104 for multiplication with w12 of internal cell 2600 which may be stored. A load mode may be selected via mode signal or flag 2662 as a control select input to multiplexer 2661. Multiplexer 2661 has a c port as an input port, and another input to multiplexer 2661 is sourced from an output port of storage 2660. Thus, in a back-substitution mode or a triangularization mode, output of multiplexer 2661 is sourced from the c port as flag 2662 is not asserted. However, in a multiplication mode, flag 2662 is asserted, and thus in this example w12 obtained from storage 2660 is selected for output from multiplexer 2661. The output of multiplexer 2661 is provided as an input to multiplier 1104, and the output of multiplier 1104 is passed to one of the inputs of adder 1106. It should be understood that the storage 2660 could have the value of the upper triangular matrix after the triangularization process and the inverse of the upper triangular matrix after the back-substitution process. Alternately, any upper triangular matrix could be loaded into this storage.

A multiplexer 2663 has an input port sourced from an s port of cell 2600, and another input of multiplexer 2663 is coupled to receive output from adder 1106. Flag 2662 is provided as a control select signal to multiplexer 2663, which when asserted selects output from adder 1106 as its output. Accordingly, a right-side neighboring internal cell for example is coupled to receive output from multiplexer 2663. It should be understood that input at an s port of cell 2600 may be preconditioned such that multiplexer 2602 and bypass path 2603 may be omitted. Furthermore, to avoid adding another multiplexer, register 1107 may be loaded with a logic 1 as part of a multiplication mode, where such logic 1 is for multiplication with input from the s port of cell 2600.

Output z from multiplexer 2604 is provided as an input to multiplexer 2664. Another input to multiplexer 2604 is the input to cell 2600, which in this exemplary embodiment is depicted as being sourced from the output of input multiplexer 2601. Again, input multiplexer may be omitted in another embodiment, and thus input to cell 2600 is provided as an input to multiplexer 2664 as well as elsewhere. For flag 2662 not assert, output of multiplexer 2664 is z output from cell 2600. However, for flag 2662 being asserted, output of multiplexer is input to cell 2600. Continuing the example, for flag 2662 being asserted, a below neighboring cell to cell 2600 receives input a21.

For purposes of clarity by way of example and not limitation, for an input row of systolic array 2300, which is conditioned after back-substitution with a matrix $R^{-1}$, output from an s port of boundary cell 2301, which is the result of w11*a11 is provided to an s port of internal cell 2302 for addition with a result of w12*a21 for accumulation. A total for such accumulation is provided to an s port of internal cell 2303 to be added with the result of w13*a31 by adder 1106, and so on for internal cell 2304 to produce a result for Equation 2711.

Likewise, calculations for Equations 2712, 2713, and 2714 for each of their respective rows may be performed where, for example a21, a31, and a41, are respectively passed from cells 2302, 2303, and 2304, respectively to cell 2310, 2312, and 2313 respectively from z ports to x input ports. Thus, rows of matrix A1 may be respectively passed down in columns of systolic array 2300.

Thus, matrix A1 input to systolic array 2300 after a back-substitution is right multiplied with matrix $R^{-1}$. In other words, matrix A1 is right multiplied with upper triangular matrix $R^{-1}$, namely $R^{-1}$A1. Alternatively, cells of systolic array 2300 may be preloaded with an upper triangular matrix into registers thereof to be multiplied with an input matrix.

Thus, row-wise input of matrix A1, which is vertically aligned for a column-wise input into systolic array 2300 for multiplication with upper triangular matrix $R^{-1}$, produces a right multiplied matrix result, where stored values of upper triangular matrix $R^{-1}$ are multiplied element by element with input matrix A1. Each multiplication result is moved to the right of systolic array 2300 generally to provide an accumulated output, as generally indicated by Equations 2711 through 2714. More particularly, for rows of systolic array 2300 with one or more internal cells, such multiplication results are accumulated to provide an output, as generally indicated by Equations 2711 through 2713. For Equation 2714, there is not such an accumulation of multiplication results.

To recapitulate, row-wise input of matrix A1 column-wise into systolic array 2300 propagates in a downward direction as depicted in FIG. 27 within systolic array 2300. Thus, each cell of a row of systolic array 2300 multiplies its input with a stored value of matrix $R^{-1}$, and passes such result to the right. Each internal cell adds a partial result from a cell to the left thereof. The addition of the partial results for a row of systolic array 2300, namely a sub-total thereof, is passed to a next internal cell on the right, until an outcome, namely a total, is obtained to the right of systolic array 2300. As input matrix A1 is processed by each row of systolic array 2300, with matrix A1 input passed down to a next row of cells in systolic array 2300, each row of systolic array 2300 generates one element of a result matrix. Thus, for the depicted embodiment, outcomes of calculations for Equations 2711 through 2714 may be thought of as a four-by-four result matrix with results for calculations for Equations 2711 through 2714 along a first column thereof. Subsequent columns of matrix A1 as they are passed into systolic array 2300 one after the other, produce the other columns of the four-by-four result matrix. The result matrix is a four-by-four matrix with all of the elements possibly non-zero, though some could be zero as well depending on the result of the multiplication. Accordingly, it should be understood that Equations 2711 through 2714 represent a subset of outcomes from such right matrix multiplication depicted; however, other equations for such right matrix multiplication follow from Equations 2711 through 2714 for other clock cycles and thus are not listed for purposes of clarity and not limitation.

To perform a left matrix multiplication, such as A1·$R^{-1}$, using systolic array 2300, cross-diagonal transposes of values within systolic array 2300 are used as described below in additional detail. Equation 2800 of FIG. 28 depicts an exemplary embodiment of a definition of a transpose along a cross diagonal of matrix W of M-by-N dimension, where x and y are coordinates of such matrix.

Figures 28, 29, 30:
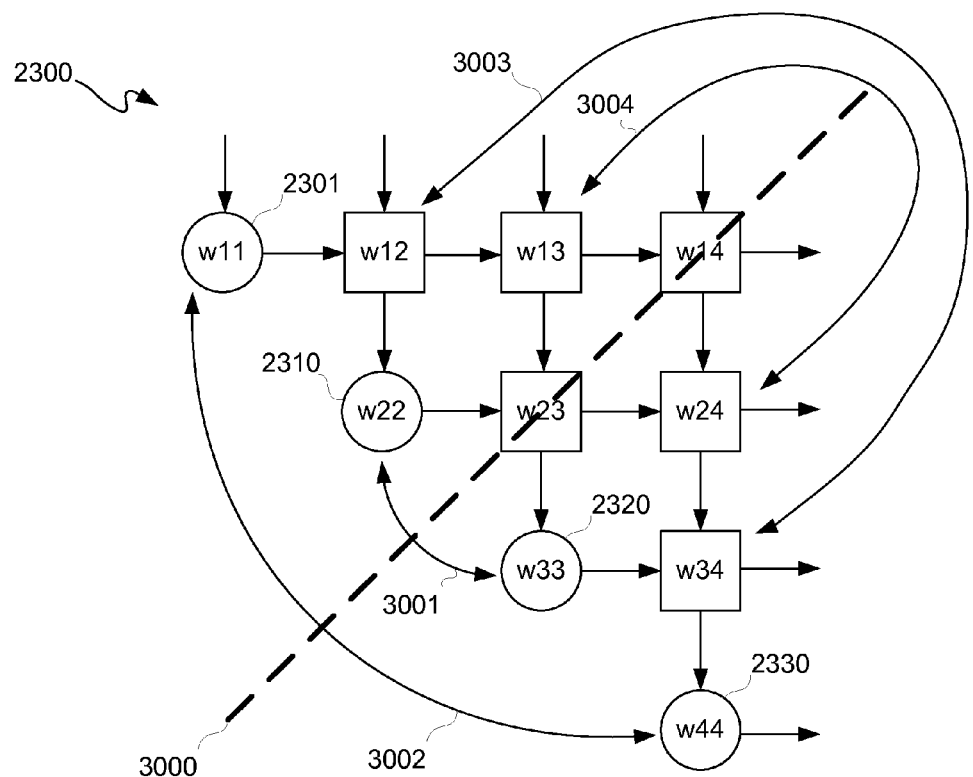
FIG. 28 is an equation depicting an exemplary embodiment of a definition of a transpose along a cross diagonal of a matrix.
FIG. 29 is an equation depicting an exemplary embodiment of a definition of an equality of left to right matrix multiplication.
FIG. 30 is a block diagram depicting an exemplary embodiment of systolic array 2300 after back-substitution with a cross-diagonal to be used as a reference for transposition.

Equation 2900 of FIG. 29 depicts an exemplary embodiment of a definition of an equality of left to right matrix multiplication. Equation 2900 indicates that a left matrix multiplication A·W is equal to a right matrix multiplication of those matrices, provided however, that cross-diagonal transposes of such matrices are used for such right matrix multiplication and that the result of such right matrix multiplication of cross-diagonal transposes of such matrices is cross-diagonally transposed.

FIG. 30 is a block diagram depicting an exemplary embodiment of systolic array 2300 after back-substitution having stored therein values for elements for matrix W or $R^{-1}$ 1703 of FIG. 17. More particularly, a cross-diagonal 3000, which is different from a main diagonal which would go through boundary cells 2301, 2310, 2320, and 2330, is used as a reference for transposition. Values of matrix W stored in boundary cells 2310 and 2320 are swapped as generally indicated with arrow 3001. Likewise, values of matrix W stored in boundary cells 2301 and 2330 are swapped as generally indicated by arrow 3002. Arrows 3003 and 3004 show swapping of matrix W values of transposed internal cells, namely where w12 and w34 values are interchanged, and where w13 and w24 values are interchanged. Values in cells along cross-diagonal 3000 are not interchanged, but are left alone for cross-diagonal transposition.

Figure 31:
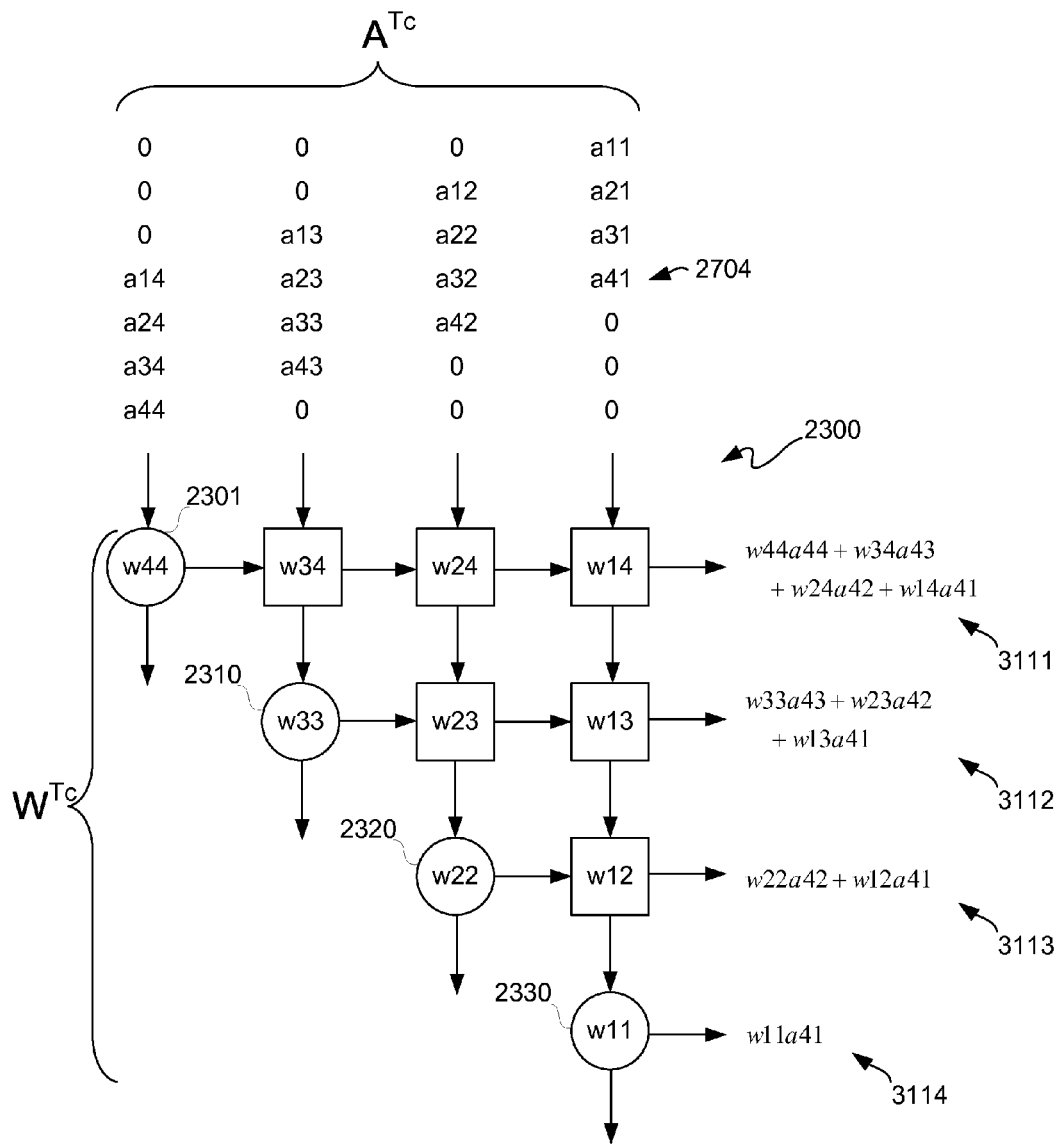
FIG. 31 is the block diagram of FIG. 30 after transposition along the cross-diagonal of FIG. 30, as well as after cross-diagonal transposition of the input matrix of FIG. 27.

FIG. 31 is the block diagram of FIG. 30 after transposition along cross-diagonal 3000 of values in systolic array 2300, as well as after cross-diagonal transposition of matrix A1, namely matrix $A^{Tc}$. After transposition along a cross-diagonal 3000, systolic array 2300 has stored therein $W^{Tc}$. For example, boundary cell 2301 has stored therein a value w44, and boundary cell 2330 has stored therein a value w11. Furthermore, boundary cell 2310 has stored therein value w33, and boundary cell 2320 has stored therein value w22. Likewise, internal cells not lying on cross-diagonal 3000 have the value of their cross-diagonal transpose counterpart internal cells with respect to matrix $W^{Tc}$.

Input matrix $A^{Tc}$, which is cross-diagonal transposed of matrix A1, is input to systolic array 2300 for right matrix multiplication as previously described. It should be understood that an input matrix, for example matrix A1, may be stored in memory, and thus obtaining a cross-diagonal transpose of such input matrix may involve reading out values for such stored input matrix in a cross-diagonal transpose order. Upper triangular matrix W of systolic array 2300 of FIG. 27 may have values therein read out and stored in memory. For performing a cross-diagonal transpose of matrix W, such values for matrix W may be read out from memory in a cross-diagonal transpose order for preloading systolic array 2300 with a cross-diagonal transpose of matrix W, namely matrix $W^{Tc}$ as indicated in FIG. 31.

Cross-diagonal transpose matrix $A^{Tc}$ may then be right multiplied with cross diagonal transpose matrix $W^{Tc}$ by systolic array 2300 for producing a resultant matrix from the right of systolic array 2300 as generally indicated by Equations 3111 through 3114. As such right multiplication with systolic array 2300 was previously described, such description is not repeated here. However, a resultant matrix from such multiplication, as generally indicated in FIG. 31 by Equations 3111 through 3114, may have a cross-diagonal transpose performed thereon as generally indicated in FIG. 32.

Figure 32:
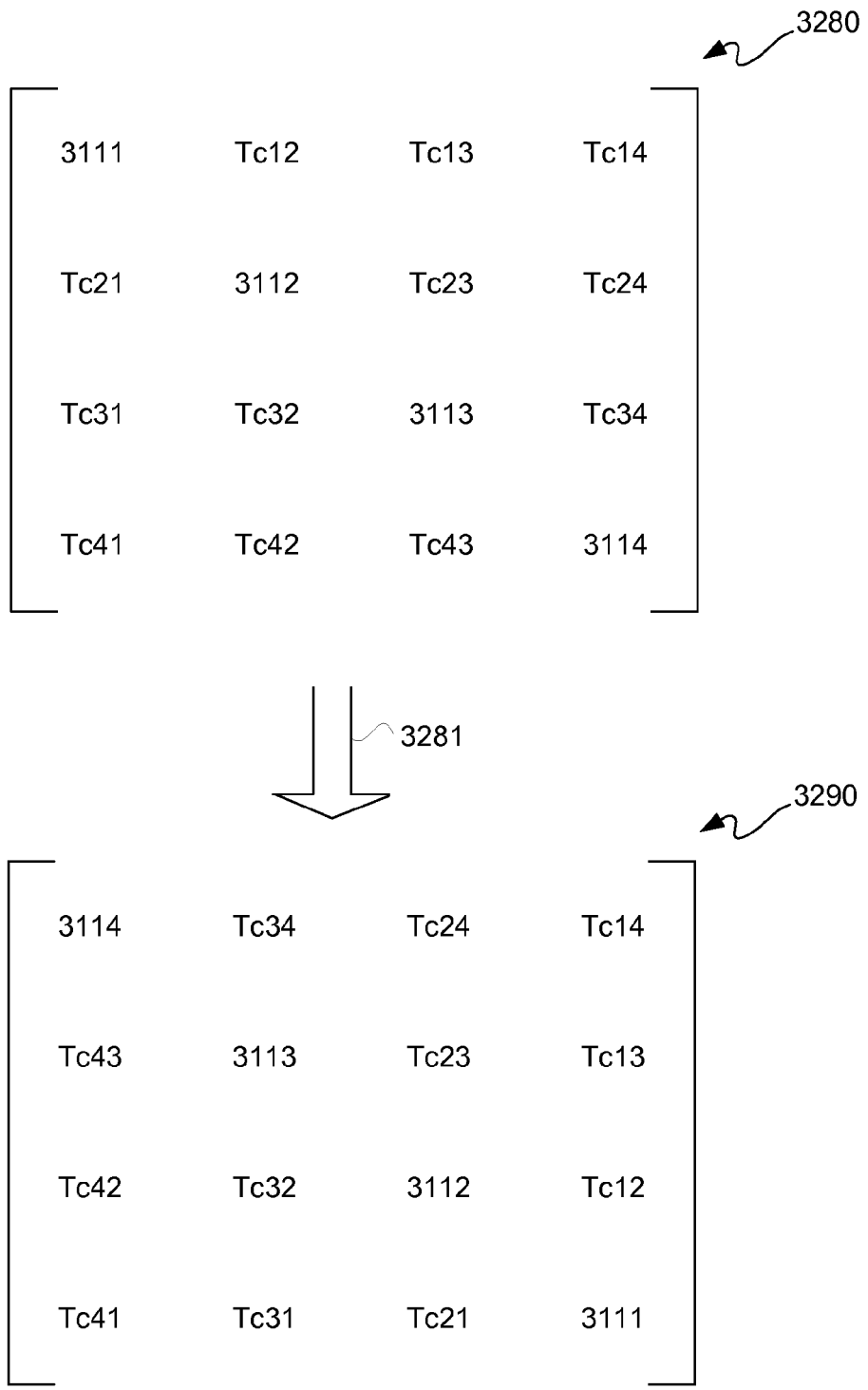
FIG. 32 is a flow diagram depicting an exemplary embodiment of a cross-diagonal transpose matrix of an interim result matrix.

FIG. 32 is a matrix-flow diagram depicting an exemplary embodiment of a cross-diagonal transpose matrix 3290 of an interim result matrix 3280. Interim result matrix 3280 is a result from $W^{Tc} A^{Tc}$. Results from Equations 3111 through 3114 are indicated along the fourth row of matrix 3280. Results from other calculations performed by systolic array 2300 for such right matrix multiplication are generally indicated as Tc values with x and y matrix coordinates. Arrow 3281 generally indicates that matrix 3280 may be written to memory in a cross-diagonal transpose order to store as a left matrix multiplication result. Alternatively, matrix 3280 may be written to memory in an original order, and subsequently read from memory in a cross-diagonal transpose order to provide a left matrix multiplication result. Matrix 3290 is a cross-diagonal transpose of matrix 3280.

A right multiplication of a cross-diagonal transpose matrix with another cross-diagonal transpose matrix, the result of which is cross-diagonal transposed, is equivalent to a left matrix multiplication as generally indicated by Equation 2900 of FIG. 29. Accordingly, it should be appreciated that a same systolic array 2300 may be used to perform triangularization, back-substitution, right matrix multiplication, and left matrix multiplication. With respect to left matrix multiplication, memory may be coupled to such systolic array for storing matrices, and reading out or writing in such matrices in any or any combination of an original order, a result order, a main diagonal transpose order, or a cross-diagonal transpose order.

While cross-diagonal transposition as indicated by Equation 2900 of FIG. 29 may be used for obtaining the result of a left matrix multiplication in the context of systolic array 2300, it should be appreciated that such left matrix multiplication process is not limited to systolic array 2300, but may be used on any array, systolic or not, coupled to memory as described herein. However, it should be understood in the context of MIMO decoder 1304 of FIG. 14 that transpose block 1410 and Givens rotation block 1310 may be combined with respect to use of a same systolic array. In other words, matrix inversion block 1402 may have a single systolic array which is multi-modal in the sense that it may be used for performing triangularization, back-substitution, right multiplication, and left matrix multiplication. Transpose block 1410 may thus include memory for storing matrices and configured for providing cross-diagonal transpositions thereof. Furthermore, transpose block 1410 may be coupled to store a matrix Q of a QRD, complex conjugate matrix Q to provide matrix Q*, and store or read back a main diagonal transpose of matrix Q* to provide a matrix $Q^H$. For MIMO decoding, a matrix multiplication of $R^{-1}Q^H$ is used.

MMSE for a Systolic Array

Wireless communication systems employ MIMO technology to increase capacity and throughput. Generally, MIMO technology may be classified into three categories, namely spatial multiplexing, orthogonal space-time block codes, and MIMO beamforming in the presence of feedback. With respect to spatial multiplexing MIMO systems, multiple datastreams are transmitted simultaneously on the same frequency resource. The interaction of such datastreams transmitted on the same frequency resource causes noise, such as intersymbol interference, among other causes of noise. Accordingly, signal processing by a MIMO receiver having a MIMO decoder separates various MIMO channels on which multiple datastreams are transmitted for data extraction.

There are a variety of known processes for MIMO decoding with respect to spatial multiplexing MIMO systems. One such MIMO decoding process is the Minimum Mean Squared Error ("MMSE") process for a MIMO decoder. A variation of the MMSE process is the square-root MMSE process. A MIMO decoder employing such a square-root MMSE process is conventionally referred to as a square-root MMSE decoder. FIGS. 33 and 34 are listings of equations depicting exemplary embodiments of computations associated with a Square Root Minimum Mean Squared Error ("Square-Root-MMSE") process for a MIMO decoder.

As described below in additional detail, a square-root MMSE decoder may be mapped to a systolic array, where the mapping scales such systolic array responsive to a lowest dimension of a MIMO matrix. Such MIMO matrix may represent a number of wireless communication devices, such as mobile wireless devices, operating on a spatial multiplexing MIMO system at a time. The maximum size of a systolic array is restricted responsive to the lesser of the number of transmitters or receivers. In the case of communication between a mobile device, which is acting as a transmitter, and a base station, which is acting as a receiver, a systolic array as described herein scales as the number of mobile devices actively transmitting to the base station, namely the number of transmitters in communication with a wireless base station, regardless of the number receive antenna at such base station, namely regardless of the number of receivers of such base station, provided, however, that the number of receive antennas at the base station is always greater than or equal to the maximum number of transmitters possible in the communication system.

Spatial multiplexing MIMO systems generally have at least as many receive antennas as the number of transmit antennas. However, a signal model for a MIMO system may generally be defined as indicated in Equation 3201 of FIG. 33. In the following description, some variable names that were previously used are used again with new meanings. Accordingly, such new meanings are defined or otherwise indicated and persists through the remainder of this description.

In FIG. 33, in Equation 3201, x is at least one symbol being transmitted, H is at least one channel, y is at least one symbol received, and n is noise. However, a more practical view of Equation 3201 is that a receive node may have $n_R$ receive antennas and a transmit node may have $n_T$ transmit antennas. This may further include instances where there are multiple mobile devices, each with one antenna communicating simultaneously with the base station. Mathematically, y is thus a vector of signals associated with the number of receive antennas, and thus particularly, y in Equation 3201 may be expressed as an $n_R$-by-one matrix representing a vector of receive symbols. Likewise, x in Equation 3201 may be expressed as an $n_T$-by-one matrix representing a vector of transmit signals. In other words, $n_R$-by-one receive symbols are obtained for transmission of $n_T$-by-one transmit symbols.

A channel matrix H may be expressed as an $n_R$-by-$n_T$ matrix of channel coefficients. For purposes of clarity by way of example and not limitation, if there are 4 receive antennas and 4 transmit antennas, then there is a possibility of 16 separate channels for transmission of transmit symbols x which are received as receive symbols y. Receive antennas may be thought of as rows in channel matrix H, and, transmit antennas may be thought of as columns in channel matrix H. It should be understood that in such a MIMO system, transmission of transmit symbols on separate transmit antennas promotes interference among the channels as the signals tend to combine over the air. These combined signals are received at the receive antennas and random noise or thermal noise is added at the receiver circuitry, namely noise which is represented at least in part as n in equation 3201. More particularly, n is an $n_R$-by-one vector of noise terms respective associated with noise at each receive antenna. Thus it should be understood that the matrix of received signals and the matrix of noise terms are of the same dimension. For purposes of clarity, single column matrices are hereinafter referred to as vectors.

In operation, because transmit symbols are interfered with, an estimate of such transmit symbols, namely $\hat{x}$ of Equation 3202, is to be determined. In order to determine what transmit symbols x originally represented, received symbols y are multiplied with a weighted matrix W as indicated in Equation 3202 to determine an estimate of x, namely $\hat{x}$. Generally, because received symbols y are known or observable at a receiver, such receive symbols y may be weighted in order to estimate what symbols were originally sent from a transmit node. For purposes of clarity by way of example and not limitation, assuming there are four transmit antennas and four receive antennas, then generally four transmit symbols may be said to be received at a time for association with four receive symbols received. It should be understood that there could be fewer transmit antennas than receive antennas, for example, there could be 2 transmit antennas and 4 receive antennas. One way of determining weight matrix W, namely a $n_T$-by-$n_R$ matrix of weights, for estimating x is by using an MMSE implementation of a MIMO decoder. In other words, an estimate $\hat{x}$ of transmit symbols x based on received symbols y may be calculated by minimizing a mean squared error as indicated in Equation 3203 of FIG. 33. Subtracting $\hat{x}$ from x identifies the difference or amount of error introduced by noise. Multiplying this difference by the Hermitian transpose of such difference, results in a squared error. It should be understood that x and $\hat{x}$ are complex numbers, and thus the Hermitian transpose is used to obtain a squared error. The symbol E in Equation 3203 indicates obtaining the mean of such squared error. Accordingly, the symbol J in Equation 3203 is the mean squared error. Thus the intent is to minimize J in order to minimize the amount of error.

In order to find a minimum value of J, there are statistical solutions for doing so. One approach is identified in Equation 3204 of FIG. 33, where weighted matrix W of Equation 3202 is determined to minimize J. In Equation 3204, a scalar a is squared, and an identity matrix $I_{n_T}$ is multiplied by $\sigma^2$, where identity matrix $I_{n_T}$ is a one-by-$n_T$ matrix. In Equation 3204, channel matrix H is multiplied by a Hermitian transpose of channel matrix H. The result of such matrix multiplication is added to such scaled identity matrix, and the sum of the matrix addition is inverted for multiplication with the Hermitian transpose of the channel matrix H.

As Equation 3204 is well known, it is not described in unnecessary detail herein. However, it should be understood that determining W in Equation 3204 for use in Equation 3202 involves a pre-multiplication of $H^H H$ matrix and a post-addition, post-inversion multiplication with $H^H$.

As described below in additional detail, an extended channel matrix may be defined to further reduce the complexity associated with implementation of Equation 3204. This alternative solution to Equation 3204 is known as a square-root MMSE. For a square-root MMSE, an extended channel matrix 3205 and extended receive symbol matrix 3206 of FIG. 33 are defined. More particularly, $\overline{H}$ is defined as a channel matrix H having additional rows added on to it. The additional rows are associated with the square-root of the identity matrix term of Equation 3204, namely matrix $\sigma I_{n_T-F}$. Even though the channel matrix H in the extended channel matrix $\overline{H}$ 3205 is indicated with a subscript $n_R$-by-$n_T$ ("nR× nT") to indicate its dimensions, it should be understood that channel matrix H in extended channel matrix 3205 is the same as channel matrix H in Equation 3204.

Likewise, extended receive symbol matrix, $\overline{y}$, is defined as the matrix of receive symbols y as indicated in Equations 3201 and 3202 with zero padding. Zero padding is for the additional rows, namely extended vector $\overline{y}$ has the same number of rows as extended channel matrix $\overline{H}$. Accordingly, zero padded rows $0_{n_T \times 1}$ or $0_{n_T}$ rows are added to vector y as indicated in extended receive symbol matrix Equation 3206.

Rather than using Equation 3204 for W in Equation 3202, extended channel matrix $\overline{H}$ and extended receive symbol matrix $\overline{y}$ are substituted for an alternative expression of Equation 3202, namely Equation 3207. By using extended channel matrix $\overline{H}$ to replace channel matrix H of Equation 3204 and replacing vector y with extended vector $\overline{y}$ in Equation 3202, Equation 3202 alternatively may be expressed as indicated in Equation 3207.

It should be understood that this formulation of an MMSE implementation avoids a pre-multiplication of $H^H H$, and further avoids a post-multiplication by $H^H$. In addition to reducing the number multipliers in an implementation, Equation 3207 has fixed precision lengths for matrix inversion which are smaller than those of an equivalent implementation of Equation 3204.

It should be understood that MMSE and square root MMSE implementations involve matrix inversion or a pseudo-inverse. Again, a Moore-Penrose pseudo-inverse is equivalent to a matrix inverse for square matrices. However, for non-square matrices only a Moore-Penrose pseudo-inverse is defined.

To generate a pseudo-inverse, as well as an inverse, of a matrix associated with QRD, the definition of a channel matrix H as in Equation 3211 and a Moore-Penrose pseudo-inverse of a channel matrix $H^\dagger$ as in Equation 3212 both of FIG. 33 may be used. It should be understood that matrix Q is unitary and a matrix R is an upper right triangular matrix. It should further be understood that a unitary matrix has a convenient inverse, namely the inverse of a unitary matrix Q is equal to the Hermitian transpose of such matrix as previously described. Furthermore, an upper right triangular matrix may be inverted by back-substitution as previously described. Equation 3212 may be used for an alternative expression of the Moore-Penrose pseudo-inverse of extended channel matrix $\overline{H}^\dagger$ in Equation 3207. It should be understood that this substitution significantly reduces complexity of an implementation of Equation 3207. With this substitution, an implementation for solving for W using a systolic array is described.

In order to substitute into Equation 3207 the expression of Equation 3212, extended matrices Q and R associated with a QRD are defined as generally indicated in Equation 3301 of FIG. 34. More particularly, in order to expand matrices Q and R to express extended channel matrix H, a maximum dimension in one direction, whether it be rows or columns, is used. For an extended channel matrix for QRD as indicated in Equation 3301, Q is a square matrix which takes such maximum dimension, whether it be rows or columns, of extended channel matrix H. Assuming for purposes of clarity by way of example and not limitation, that extended channel matrix H because of the additional rows added has more rows than columns, then the number of rows are added for an extended matrix Q such that Q has $n_T+n_R$ rows and an equivalent number of columns. Thus by way of example and not limitation, assuming that H was a four-by-four matrix, then matrix H would be an eight-by-four matrix, namely eight rows and four columns, and matrix Q would be an eight-by-eight matrix. Matrix R is extended only as to the number of rows, namely R has $n_T+n_R$ rows and $n_T$ columns. Continuing the above example, R would have eight rows and four columns. Thus it should be understood that a portion 3302, namely Q·R, has a left matrix multiplication form as expressed in Equation 3211, except that the decomposition is for an extended channel matrix H.

It should be understood that the inverse of a matrix is generally only defined for square matrices, and extended channel matrix H is not a square matrix. For a non-square matrix, a Moore-Penrose pseudo-inverse matrix is used. Section 3209 of Equation 3207 is of the form of a Moore-Penrose pseudo-inverse, which is indicated in Equation 3210 of FIG. 33. However, as the extended channel matrix H is used instead of channel matrix H, then equivalent Equation 3208 to Wy may be reduced to $H^\dagger$ multiplied by y, where $H^\dagger$ indicates the Moore-Penrose pseudo-inverse of extended channel matrix H.

Matrix R is an upper right triangular matrix. Accordingly, at least all of the values under the main diagonal of matrix R are zero. Additionally, it should be understood that the bottom $n_T$ number of rows of matrix R are all zeros, namely zero padding. Matrix Q may be broken up into $Q_1$ and $Q_2$, where matrix $Q_1$ is the top $n_R$ number of rows of matrix Q and matrix $Q_2$ is the bottom $n_T$ number of rows of matrix Q.

The expression of extended channel matrix H as expressed in Equation 3301 may be equated with the expression of extended channel matrix H as expressed in Equation 3205, and thus it should be understood that $\sigma I_{n_T}$ is equivalent to matrix $Q_2$ multiplied by R as indicated in Equation 3303 of FIG. 34. An alternative expression of matrix $R^{-1}$ using Equation 3303 is indicated in Equation 3304. It should be understood that matrix $R^{-1}$ is part of the Moore-Penrose pseudo-inverse of the extended channel matrix $H^\dagger$ expressed in Equation 3207 with respect to its alternative expression as generally indicated in Equation 3212. However, rather than actually inverting matrix R, matrix $Q_2$ may be divided by a scalar, namely divided by a, to obtain matrix $R^{-1}$, as indicated in Equation 3304.

From the above description of equations, it should be understood that estimate transmit symbols of vector $\hat{x}$ of Equation 3202 may be alternatively written as equivalent portions 3306 and 3307 as indicated in Equation 3305 of FIG. 34. However, it should be understood that the last $n_R$ columns of matrices Q, Q1, and Q2 may reasonably be ignored. By equating an upper block or quadrant of matrix Q, namely matrix $Q_1$, an alternative expression for channel matrix H may be used as indicated in Equation 3312. Equation 3312 may be rewritten as indicated in Equation 3309, and thus matrix $Q_1$ may alternatively be expressed as indicated in Equation 3309. Equation 3312 is for a left multiplication of the matrix Q1 with the upper triangular matrix R, and Equation 3309 is for a left multiplication of the matrix H with the upper triangular matrix $R^{-1}$.

It should be understood that portion 3307 avoids back-substitution to invert matrix R; however, implementation of portion 3307 is at the expense of having to have a larger array of circuits as extra rows are added to compute the matrix Q2 using the extended channel matrix H. From the following description it should be understood that extra computations associated with processing an extended channel matrix H as described above for a square-root MMSE implementation are avoided with an implementation of portion 3308 of Equation 3305, namely a weight matrix W as indicated in Equation 3311. Because matrix $Q_1$ is smaller than matrix Q, a smaller systolic array may be used. Using this smaller systolic array, Q1 may be computed by a left multiplication of H with the upper triangular matrix $R^{-1}$ which was previously computed on the same systolic array using back-substitution. It should be understood that this formulation of an MMSE implementation avoids a pre-multiplication of $H^H H$, and further avoids a post-multiplication by $H^H$. In addition to reducing the number multipliers in an implementation, Equation 3207 has fixed precision lengths for matrix inversion which are smaller than those of an equivalent implementation of Equation 3204. From the following description it will be appreciated that square-root MMSE implementation scales with the smaller dimension of a channel matrix H, namely scales with the number of subscriber units and not the number of antennas at a base station. In other words, little to no extra circuit or hardware cost is incurred if additional antennas are added at the base station.

The following a square-root MMSE implementation avoids a pre-multiplication by $H^H H$ as well as post-multiplication with $H^H$, with triangularization of an extended channel matrix H. However, rather than avoiding a back-substitution operation to calculate $R^{-1}$ by calculating $Q_2$, which thus involves computing a significantly larger matrix Q of dimension as indicated in Equation 3310 of FIG. 34, back-substitution is used to compute $R^{-1}$. However, as indicated by Equations 3305, 3308, and 3309, as well as the example of FIG. 35, only a portion of a matrix Q, namely matrix $Q_1$, is used to calculate an MMSE result. Multiplying as indicated in Equation 3311 to obtain weighted matrix W provides an MMSE result when multiplied with received symbol matrix y, as indicated in Equation 3305.

Thus, computation of a larger matrix Q is avoided by using matrix $Q_1$ and by computing matrix $R^{-1}$ by back-substitution. Matrix R may be inverted using back-substitution, which avoids matrix Q2 computation and by using the relationship expressed in Equation 3309 to determine a value to compute matrix $Q_1$. Triangularization of an extended channel matrix H as part of a QRD leads to an upper triangular matrix R having a same number of non-zero rows as in matrix R of Equation 3211 computed by triangularizing channel matrix H.

If all operations are mapped to a systolic array, computation of a QRD of an extended channel matrix H may involve a significantly large systolic array, with size scaling associated with larger dimension of such extended channel matrix. However, by mapping operations on a systolic array and using the same systolic array to compute matrix $R^{-1}$ and matrix $Q_1$, as described above, with respect to a modified Givens rotation matrix for QRD, back-substitution using such same systolic array as implemented for such modified Givens rotation matrix to compute matrix $R^{-1}$, and left and right matrix multiplications using such same systolic array, a square-root MMSE result may be determined using a systolic array whose dimensions scale as the smaller dimension of channel matrix H. Accordingly, a square-root MMSE result may be computed without having to use extra computational circuit resources to process an extended channel matrix H while still having benefit of avoiding a pre-multiplication $\overline{H}^H H$ and a post-multiplication with $H^H$.

FIG. 35 is a block diagram depicting an exemplary embodiment of a square-root MMSE process 3500. For purposes of clarity by way of example and not limitation, it shall be assumed that a two receive antenna and two transmit antenna MIMO system is being described. However, it should be understood that smaller or larger MIMO systems may be implemented. Furthermore, MIMO systems having more receive antennas than transmit antennas may be used. For example, this includes a MIMO system of two transmit antennas and four receive antennas, which leads to a 4-by-2 channel matrix, namely a matrix with four rows and two columns. Such MIMO system has a channel matrix H 3501 having channel coefficients $h_{11}$, $h_{12}$, $h_{21}$, and $h_{22}$. In channel matrix H 3501, receive antennas are associated with rows and transmit antennas are associated with columns. Accordingly, for example, channel coefficient h21 is from transmit antenna one to receive antenna two.

At operation 3530, channel matrix H 3501 is converted to extended channel matrix H 3502. Extended channel matrix H 3502 is channel matrix H 3501 having rows appended thereto, where such rows are an identity matrix multiplied by a scalar as previously described.

Thus, a two-by-two channel matrix is augmented to provide an extended channel matrix which is a four-by-two matrix, as the number of additional rows is equivalent to the number of transmit antennas. A QRD operation 3520 may be performed on extended channel matrix H 3502 to provide matrix Q 3510 and matrix R 3506. Matrix Q 3510 is a four-by-four matrix, with x's denoting the position of elements therein. Matrix R 3506 is a four-by-two matrix.

In matrix R 3506 the bottom two rows are all zeros. Accordingly, the last two columns of matrix Q 3510, namely portion 3505 of matrix Q 3510, are don't care values. Because portion 3505 is not used, portion 3505 may be omitted from QRD 3520, namely a smaller systolic array may be used.

Based on the dimensions of channel matrix H, matrix $Q_1$ 3503 may be parsed from matrix $Q_2$ 3504 with respect to matrix Q 3510. Matrix $Q_1$ 3503 is the upper-leftmost quadrant of matrix Q 3510, and matrix Q2 3504 is a lower-leftmost quadrant of matrix Q 3510. From Equation 3311 of FIG. 34, it should be understood that matrix $Q_2$ 3504 is not part of the solution for matrix W.

Furthermore, it should be understood that matrix R 3506 is a triangularization of extended channel matrix H 3502, and such triangularization may be performed using a systolic array configured for a modified Givens rotation as previously described. Furthermore, such systolic array, which is conditioned with values for matrix R 3506 after triangularization of extended channel matrix H 3502, may be used for back-substitution to invert matrix R 3506. So, rather than using matrix $Q_2$ 3504 to determine an inverse of matrix R 3506, as was indicated for example in Equation 3304 of FIG. 34, matrix $Q_1$ 3503 may be computed as indicated in Equation 3309. In other words, even though matrix $Q_2$ 3504 would avoid a back-substitution operation, using matrix $Q_2$ 3504 means processing all values of matrix Q 3510, namely implementing a systolic array to process values for portion 3505, which are all don't cares. However, because the same systolic array may be used for performing back-substitution for a modified Givens rotation matrix as previously described and such same systolic array may be used to generate an inverse of matrix R, only one portion of matrix Q 3510, namely for matrix $Q_1$ 3503, may be implemented as a systolic array for the example of a two-by-two MIMO system. In other words, because only matrix $Q_1$ 3503 is used, a two-by-two systolic array may be implemented rather than a four-by-four systolic array if $Q_2$ 3504 were used. It should however be understood that matrices multiplied using a systolic array, such as channel matrix H and the Q1 matrix for example, may have dimension greater than two-by-two. For the example of a two-by-four MIMO system, with two transmitters and four receivers, channel matrix H, is a four-by-two matrix, and matrix Q1 is a four-by-two matrix but such systolic array is a two-by-two array.

Figure 36:
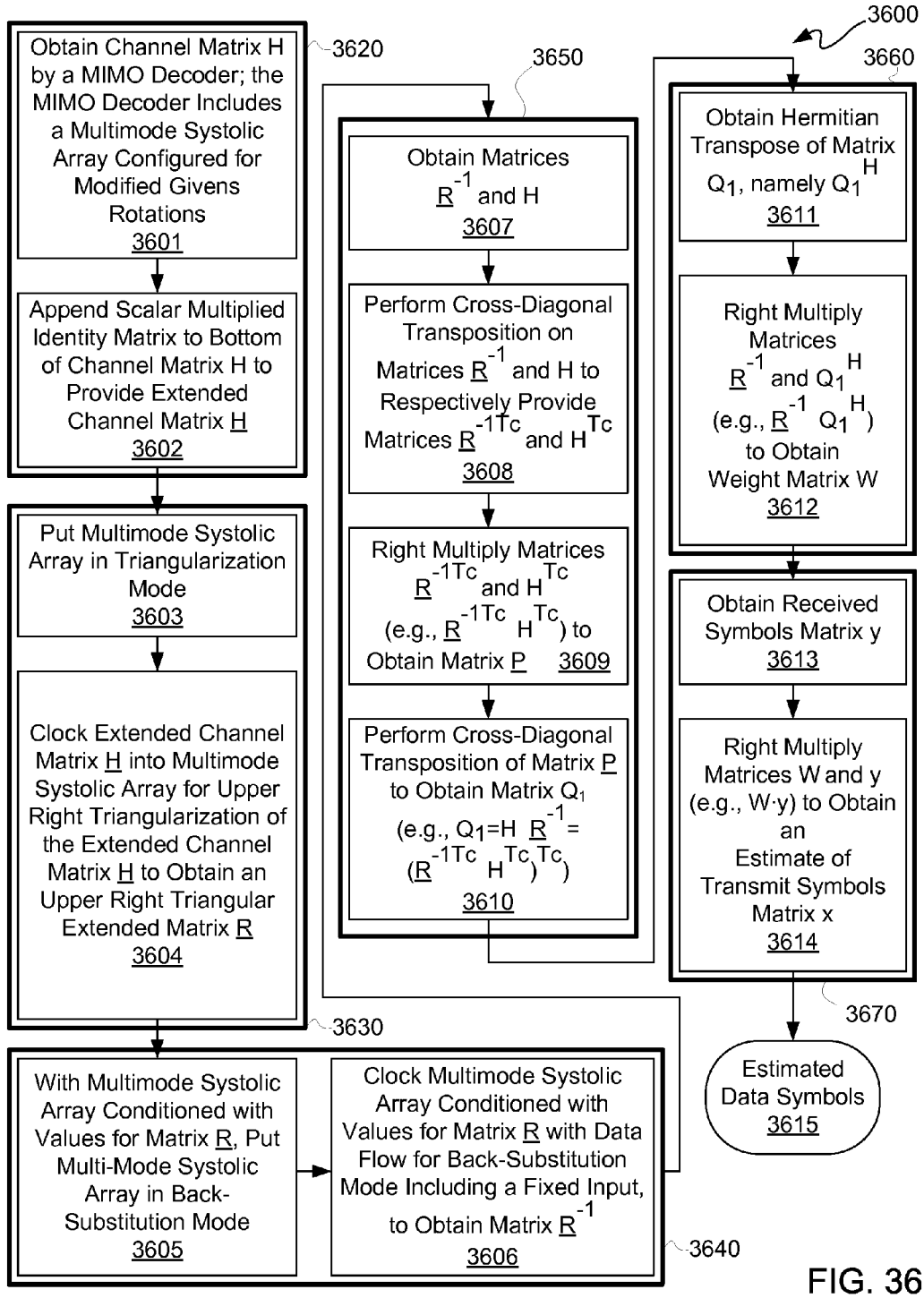
FIG. 36 is a flow diagram depicting an exemplary embodiment of a decoding flow for a MIMO decoder.
Figure 37:
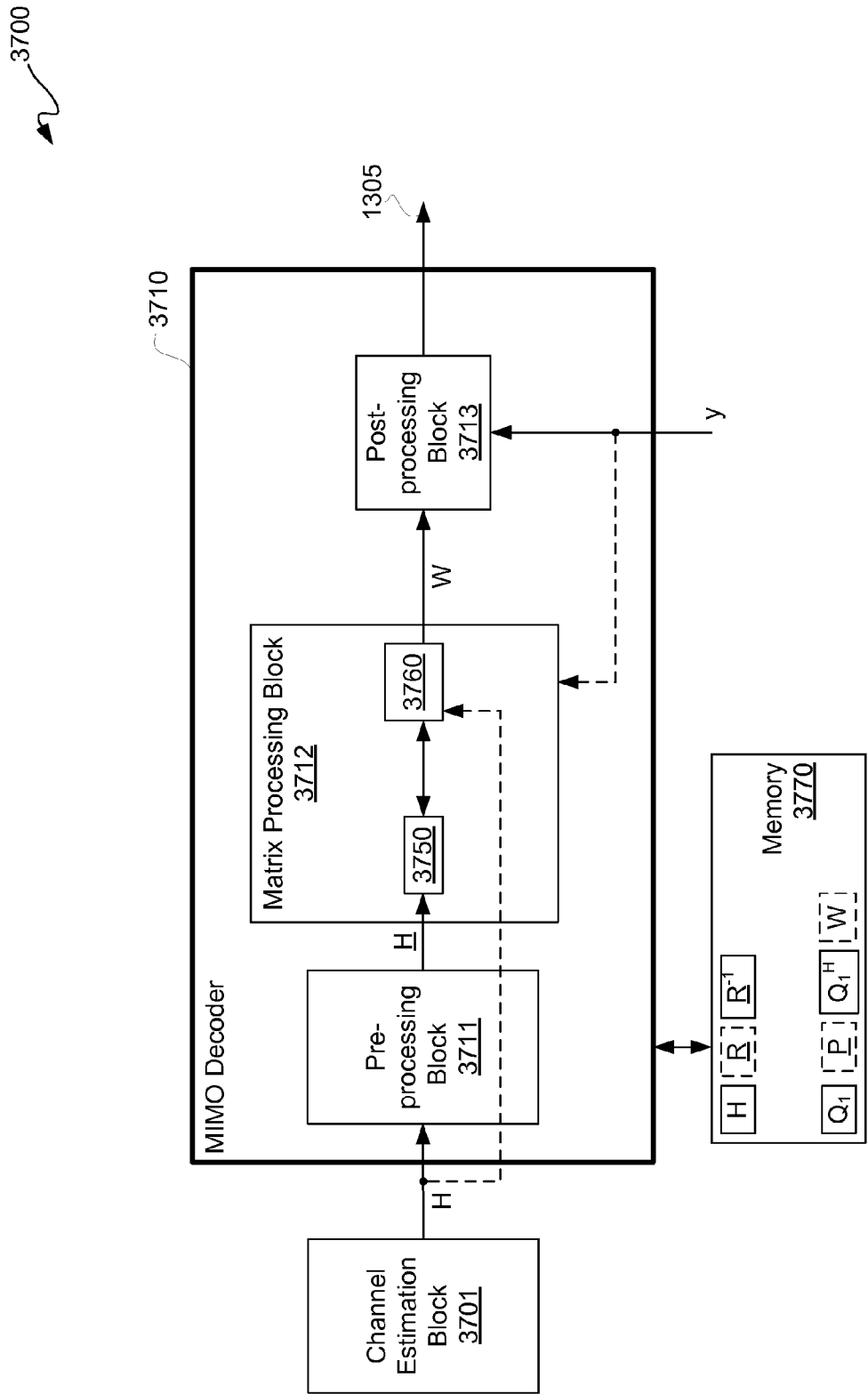
FIG. 37 is a block diagram depicting an exemplary embodiment of a receive node that includes a channel estimation block and a MIMO decoder.

FIG. 36 is a flow diagram depicting an exemplary embodiment of a decoding flow 3600 for a MIMO decoder. FIG. 37 is a block diagram depicting an exemplary embodiment of a receive node 3700, receive node 3700 includes channel estimation block 3701 and MIMO decoder 3710. It should further be understood that MIMO decoder 3710 may be a square-root MMSE MIMO decoder, which is a variant of a MMSE MIMO decoder. With simultaneous reference to FIGS. 35, 36, and 37, MIMO decoding flow 3600 is further described.

Channel estimation block 3701 provides channel coefficients which may be in the form of a channel matrix H, such as channel matrix 3501 for example, to preprocessing block 3711. At 3601, a channel matrix H is obtained as an input to a MIMO decoder 3710. MIMO decoder 3710 includes preprocessing block 3711, matrix processing block 3712, and post-processing block 3713. MIMO decoder 3710 may include or be coupled to memory 3770. Matrix processing block 3712 includes a multimode systolic array 3750 configured for modified Givens rotations and a complex conjugate, transpose, and memory interface block 3760 as described herein.

At 3602, a scalar multiplied identity matrix, such as previously described, is appended to channel matrix H to provide extended channel matrix H. Extended channel matrix H, such as extended channel matrix 3502 for example, may be stored in memory 3770 coupled to MIMO decoder 3710. Preprocessing block 3711 may be coupled to append a scalar multiplied identity matrix to channel matrix H. Operations at 3601 and 3602 may be thought of as generating an extended channel matrix operation 3620.

Preprocessing block 3711 provides extended channel matrix H to matrix processing block 3712. At 3603, multimode systolic array 3750 is put in a triangularization mode, if not already in a triangularization mode. It should be understood that multimode systolic array 3750 may be a systolic array configurable for triangularization with modified Givens rotations, back-substitution, right multiplication, and left multiplication, as described elsewhere herein.

At 3604, extended channel matrix H is clocked into multimode systolic array 3750 for upper right triangularization of extended channel matrix H. A result of clock operation of multimode systolic array 3750 in a triangularization mode is an upper right triangularization of extended channel matrix H, namely upper right triangular extended matrix R. An upper right triangular matrix R may be output for storage in memory 3770, which memory 3770 may be coupled to MIMO decoder 3710. It should be understood that after triangularization of extended channel matrix H, multimode systolic array 3750 is conditioned with values for upper right triangular extended matrix R and such values may optionally be output from storage in memory 3770. Generally, operations 3603 and 3604 may be thought of as a triangularization operation 3630.

At 3605, with multimode systolic array 3750 conditioned with matrix R, multimode systolic array 3750 may be set to be in a back-substitution mode. At 3606, multimode systolic array 3750 conditioned with values for matrix R with dataflow set for a back-substitution mode, including a fixed input to an input row of such multimode systolic array as previously described, produces an inversion of matrix R, namely matrix $R^{-1}$. Accordingly, it should be appreciated that operations at 3605 and 3606 may be thought of as a matrix inversion operation 3640, where such matrix inversion is performed by back-substitution. Matrix $R^{-1}$ may be stored in memory 3770.

At 3607, matrices $R^{-1}$ and H are obtained by memory interface block 3760 from memory 3770. Alternatively, either or both of matrices $R^{-1}$ and H may be directly obtained from block 3701 and multimode systolic array 3750, respectively.

Block 3760 is configured in part for cross-diagonal transposition of matrices. More particularly, at 3608, matrices $R^{-1}$ and H are cross-diagonally transposed by reading them out from memory 3770 in a cross-diagonal order by block 3706 to respectively provide matrices $R^{-1Tc}$ and $H^{Tc}$.

At 3609, multimode systolic array is put in matrix multiplication mode and matrix $R^{-1Tc}$ is loaded into multimode systolic array 3750. Furthermore, at 3609 matrix $H^{Tc}$ is zero padded and clocked into systolic array 3750 for matrix multiplication with matrix $R^{-1Tc}$ to obtain an interim result matrix P. This multiplication is a right matrix multiplication, namely $R^{-1Tc}H^{Tc}$ by systolic array 3750.

At 3610, a cross-diagonal transposition of matrix P is performed to obtain matrix $Q_1$. Optionally, interim result matrix P may be stored in memory 3770, and subsequently read from memory 3770 by block 3760 in a cross-diagonal order. Alternatively, matrix P may be obtained by block 3760 and written to memory 3770 in a cross-diagonal order as matrix $Q_1$. For purposes of clarity by way of example and not limitation, it will be assumed that matrix $Q_1$ is stored in memory 3770.

It should understood from the above description that matrix $Q_1$ is equivalent to an uppermost quadrant of a matrix Q. It should further be understood that operations 3607 through 3610 may be thought of as a left multiplication of matrices H and $R^{-1}$ as indicated in Equation 3309 of FIG. 34, namely left matrix multiplication 3650.

At 3611, a Hermitian transpose of matrix $Q_1$ may be obtained. Because matrix $Q_1$ is a unitary matrix, a Hermitian transpose of such matrix is a main-diagonal transpose of a complex conjugate of matrix $Q_1$. Block 3760 is coupled to obtain matrix $Q_1$ from memory, and perform a complex conjugation thereof. Such complex conjugate of matrix $Q_1$ may then be written to memory 3770 in a main-diagonal order by block 3760 as matrix $Q_1^H$. Alternatively, matrix $Q_1^H$ may be provided as input to systolic array 3750 for multiplication at 3612. However, for purposes of clarity by way of example and not limitation, it shall be assumed that matrix $Q_1^H$ is written to memory 3770 by block 3760.

At 3612, matrices $R^{-1}$ and $Q_1^H$ are obtained from memory 3770 by block 3760. Systolic array 3750, which may still be in a matrix multiplication mode, is loaded with matrix $R^{-1}$ for performing a right matrix multiplication with matrix $Q_1^H$. Matrix $Q_1^H$ is zero padded by block 3760 and input to systolic array 3750 for such right multiplication of matrices $R^{-1}$ and $Q_1^H$ to obtain a weight matrix W. Generally, operations at 3611 and 3612 may be considered a generation of a weight matrix W operation 3660.

Matrix W may be provided to post-processing block 3713. Post-processing block 3713 receives receive symbol vector y. Post-processing block is coupled to right multiply W and y to obtain an estimate of transmit symbols matrix x for output as estimated data symbols 1305, namely output as vector $\hat{x}$. Accordingly, at 3613 received symbols matrix y is obtained, and at 3614 a right multiplication of W and y is used to obtain an estimate of transmit symbols matrix x, namely vector $\hat{x}$, at 3614. Thus, estimated data symbols 3615 may be output from flow 3600 after operation 3614 responsive to the estimated transmit symbols matrix x obtained at 3614. Accordingly, it should be understood that operations 3613 and 3614 may be thought of as a weighted estimation 3670.

Alternatively, matrix W may optionally be stored in memory 3770 by block 3760, and received symbol vector y may be loaded by block 3760 into an input row of systolic array 3750, where the remainder of systolic array 3750 would be don't cares. This depends on the number of receive antennas being equal to the number of transmit antennas. If the number of receive antennas is more than the number of transmit antennas, for example, a four-by-two channel matrix embodiment, then y may not be loaded into the systolic array and the above-described embodiment at 3611 may be used. Assuming vector y may be loaded into an input row of systolic array 3750, matrix W may then be clocked into systolic array for right multiplication with vector y to obtain estimates of transmit symbols vector $\hat{x}$ for output data symbols 1305. In this embodiment, post-processing block 3713 may be omitted. Thus, MIMO decoder 3710 may have a preprocessing block 3711 for providing an extension of channel matrix and have a matrix processing block 3712. Such matrix processing block 3712 may be implemented with a single multimode systolic array 3750 and with a control block 3760. Such control block 3760 may be coupled to perform cross-diagonal and main diagonal transposition via reads and/or writes to memory 3770, as well as complex conjugation and zero padding as described herein.

Accordingly, it should be appreciated that weight matrix W is obtained without having to perform a multiplication of Hermitian transpose of a channel matrix with such a channel matrix, inverting the subsequent matrix and without a subsequent multiplication of Hermitian transpose of the channel matrix. Furthermore, it should be appreciated that a systolic array need not be so large as to encompass the entire extended orthogonal matrix Q.

It should be appreciated that a systolic array, such as multimode systolic array 3750, may be as large as the smaller dimension of the number of transmit antennas or receive antennas or referring to the channel matrix H, the smaller of the number of rows or columns. Furthermore, such systolic array scales with such smaller dimension. It should be understood that a systolic array configured for a four-by-two system can also process a two-by-two channel matrix and all other matrix dimensions smaller than four rows and two columns, for example, one-by-one, two-by-one, three-by-two, etc.

Lastly, a MIMO decoder may be implemented with a single systolic array. Additionally, it should be appreciated that a receive diversity system may be implemented with a one-by-one systolic array, namely a single boundary cell for multimode systolic array 3750. Moreover, it should be understood that MIMO decoder 3719 may be entirely implemented in a PLD, which may include implementing either or both memory 3770 and channel estimation block 3701 in such PLD.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, even though a plain complex Givens rotation was described, it should be understood that the modified complex Givens rotation matrix may be used in other variations of Givens rotation, including squared Givens, and Square-Root and Division Free Givens rotation, among others. Furthermore, even though example uses such as a systolic array, least squares solution and matrix triangularization for MIMO decoding were described, it should be understood that a modified complex Givens rotation matrix as described herein may be used in any matrix transformation or application process for zeroing or nulling out one or more cells of a matrix potentially having a complex number. Other applications in which a modified complex Givens rotation matrix as described herein may be used include: Matrix Singular Value Decomposition, and other applications like a MIMO decoder that use matrix inversion and triangularization.

Claim(s) listing steps do not imply any order of the steps. Trademarks are the property of their respective owners.

What is claimed is:

1. A systolic array in an integrated circuit, comprising:
   boundary cells oriented along a main diagonal of the systolic array;
   internal cells disposed in a corner, wherein the systolic array is a triangular matrix;
   the boundary cells and the internal cells configurable for any of a plurality of modes including a triangularization mode, a back-substitution mode, and a multiplication mode;
   the boundary cells having first multipliers;
   the internal cells having second multipliers; and
   the first multipliers and the second multipliers for multiplication of a first matrix and a second matrix responsive to the multiplication mode being invoked.

2. The systolic array according to claim 1, further comprising memory coupled to the systolic array for storing a first matrix and a second matrix.

3. The systolic array according to claim 2, wherein the first multipliers and the second multipliers are used for each of the plurality of modes.

4. The systolic array according to claim 3, wherein:
   the first matrix is of the triangular matrix form for loading the boundary cells and the internal cell respectively; and
   the first matrix is loaded in a first cross-diagonal transpose order.

5. The systolic array according to claim 4, wherein:
   the second matrix is input to an input row of the systolic array including a boundary cell of the boundary cells and a subset of the internal cells; and
   the second matrix is input in a second cross-diagonal transpose order with zero padding for multiplication with the first matrix loaded in the cross-diagonal transpose order to provide an interim result matrix.

6. The systolic array according to claim 5, wherein the memory is coupled to the systolic array for writing the interim result matrix in a third cross-diagonal transpose order to the memory as a left matrix multiplication result.

7. The systolic array according to claim 6, wherein the triangular matrix of the systolic array is a right upper triangular matrix instantiated with digital signal processor blocks.

8. A method for configuring a systolic array for an integrated circuit, comprising:
   orienting boundary cells having first multipliers along a main diagonal of the systolic array;
   disposing internal cells having second multipliers in a corner, wherein the systolic array comprises a triangular matrix;
   wherein the boundary cells and internal cells are configurable for any of a plurality of modes including a triangularization mode, a back-substitution mode, and a multiplication mode;
   wherein the first multipliers and the second multipliers are configured for multiplication of a first matrix and a second matrix responsive to the multiplication mode being invoked.

9. The method of claim 8, further comprising:
   coupling a memory to the systolic array for storing the first matrix and the second matrix.

10. The method of claim 9, wherein the first multipliers and the second multipliers are used for each of the plurality of modes.

11. The method of claim 10, wherein:
    the first matrix is of a triangular matrix form for loading the boundary cells and the internal cells respectively; and
    the first matrix is loaded in a first cross-diagonal transpose order.

12. The method of claim 11, wherein:
    the second matrix is input to an input row of the systolic array that includes a boundary cell of the boundary cells and a subset of the internal cells; and
    the second matrix is input in a second cross-diagonal transpose order with zero padding for multiplication with the first matrix loaded in the cross-diagonal transpose order to provide an interim result matrix.

13. The method of claim 12, wherein the interim result matrix is written to the memory in a third cross-diagonal transpose order as a left matrix multiplication result.

14. The method of claim 13, wherein the triangular matrix of the systolic array is a right upper triangular matrix instantiated with digital processor blocks.

15. A non-transitory machine-readable medium having stored thereon information representing instructions that, when executed by processor means, causes the processor means to perform operations for left matrix multiplication, the operations when executed comprising:
    orienting boundary cells having first multipliers along a main diagonal of the systolic array;
    disposing internal cells having second multipliers in a corner, wherein the systolic array comprises a triangular matrix;
    wherein the boundary cells and internal cells are configurable for any of a plurality of modes including a triangularization mode, a back-substitution mode, and a multiplication mode;
    wherein the first multipliers and the second multipliers are configured for multiplication of a first matrix and a second matrix responsive to the multiplication mode being invoked.

16. The non-transitory machine-readable medium of claim 15, the operations when executed further comprising:
    coupling a memory to the systolic array for storing the first matrix and the second matrix.

17. The non-transitory machine-readable medium of claim 16, wherein the first multipliers and the second multipliers are used for each of the plurality of modes.

18. The non-transitory machine-readable medium of claim 17, wherein:
    the first matrix is of a triangular matrix form for loading the boundary cells and the internal cells respectively; and
    the first matrix is loaded in a first cross-diagonal transpose order.

19. The non-transitory machine-readable medium of claim 18, wherein:
    the second matrix is input to an input row of the systolic array that includes a boundary cell of the boundary cells and a subset of the internal cells; and
    the second matrix is input in a second cross-diagonal transpose order with zero padding for multiplication with the first matrix loaded in the cross-diagonal transpose order to provide an interim result matrix.

20. The non-transitory machine-readable medium of claim 19, wherein the interim result matrix is written to the memory in a third cross-diagonal transpose order as a left matrix multiplication result.

* * * * *